United States Patent
Wachi et al.

(10) Patent No.: US 8,693,440 B2
(45) Date of Patent: Apr. 8, 2014

(54) APPARATUS AND METHOD FOR ALLOCATING PACKETS TO A PLURALITY OF CARRIER WAVES

(75) Inventors: Hiroyuki Wachi, Kawasaki (JP); Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 13/172,229

(22) Filed: Jun. 29, 2011

(65) Prior Publication Data

US 2012/0014298 A1   Jan. 19, 2012

(30) Foreign Application Priority Data

Jul. 15, 2010   (JP) ................................. 2010-160536

(51) Int. Cl.
| | | |
|---|---|---|
| *H04W 4/00* | (2009.01) | |
| *H04W 72/12* | (2009.01) | |
| *H04W 72/08* | (2009.01) | |
| *H04W 72/04* | (2009.01) | |
| *H04L 27/26* | (2006.01) | |
| *H04L 12/56* | (2006.01) | |
| *H04L 5/00* | (2006.01) | |

(52) U.S. Cl.
CPC .......... *H04W 72/1231* (2013.01); *H04W 72/08* (2013.01); *H04W 72/04* (2013.01); *H04L 27/26* (2013.01); *H04L 47/24* (2013.01); *H04L 5/003* (2013.01)
USPC .......... 370/332; 370/329; 370/431; 455/450; 455/464; 455/452.2

(58) Field of Classification Search
None
See application file for complete search history.

(56) References Cited

U.S. PATENT DOCUMENTS

| | | | |
|---|---|---|---|
| 6,385,462 B1 * | 5/2002 | Baum et al. ................... | 455/522 |
| 2003/0142627 A1 * | 7/2003 | Chiu et al. ..................... | 370/238 |
| 2007/0096788 A1 | 5/2007 | Thesling | |
| 2009/0060033 A1 | 3/2009 | Kimmich et al. | |

FOREIGN PATENT DOCUMENTS

| | | |
|---|---|---|
| JP | 2004-129085 | 4/2004 |
| WO | 03/056774 | 7/2003 |

OTHER PUBLICATIONS

Extended European Search Report with Abstract issued for corresponding European Patent Application No. 11172642.8, dated Sep. 28, 20011.

* cited by examiner

Primary Examiner — Ian N Moore
Assistant Examiner — Jackie Zuniga Abad
(74) Attorney, Agent, or Firm — Myers Wolin, LLC

(57) ABSTRACT

Packets are transmitted from an apparatus to another apparatus via a plurality of carrier waves. The apparatus calculates, for each of the plurality of carrier waves, a tolerance parameter indicating a tolerable margin of the current line-quality value for causing a change of a modulation method to be used, based on a line-quality value received from the another apparatus, and allocates packets to the plurality of carrier waves based on a service-quality level assigned to each of the packets and the tolerance parameter calculated for each of the plurality of carrier waves, such that a first packet having the service-quality level equal to or higher than a second packet is allocated, on a priority basis, to a first carrier wave having the tolerance parameter equal to or larger than a second carrier wave to which the second packet is allocated.

6 Claims, 26 Drawing Sheets

FIG. 6

| BER | C/N VALUE (dB) | | |
|---|---|---|---|
| | 4 QAM | 16 QAM | 64 QAM |
| $1\times10^{-1}$ | 7.0 | 12.8 | 19.0 |
| $1\times10^{-2}$ | 9.2 | 15.9 | 22.2 |
| $1\times10^{-3}$ | 10.7 | 17.7 | 24.0 |
| $1\times10^{-4}$ | 12.2 | 19.3 | 25.3 |
| $1\times10^{-5}$ | 13.2 | 20.3 | 26.4 |
| $1\times10^{-6}$ | 14.1 | 21.0 | 27.3 |
| $1\times10^{-7}$ | 14.7 | 21.7 | 27.9 |
| $1\times10^{-8}$ | 15.3 | 22.3 | 28.5 |
| $1\times10^{-9}$ | 15.8 | 22.8 | 29.1 |
| $1\times10^{-10}$ | 16.4 | 23.3 | 29.6 |
| $1\times10^{-11}$ | 16.7 | 23.7 | 30.0 |
| $1\times10^{-12}$ | 17.2 | 24.1 | 30.4 |

FIG. 15

| | N(0) | N(1) | N(2) | ... | N(T-1) | N(T) | VARIATION RATE |
|---|---|---|---|---|---|---|---|
| W1 | 252 | 234 | 212 | ... | 204 | 222 | - |
| W2 | 53 | 42 | 41 | ... | 52 | 46 | - |
| ΔN(W1) | - | 18 | 22 | ... | ... | 18 | 3.2 |
| ΔN(W2) | - | 11 | 1 | ... | ... | 6 | 9.6 |

| VARIATION RATE (R) | TOLERANCE PARAMETER (N) | | |
|---|---|---|---|
| | LARGE | MEDIUM | SMALL |
| SMALL | 1 | 2 | 3 |
| MEDIUM | 4 | 5 | 6 |
| LARGE | 7 | 8 | 9 |

| BER | RL (dBm) | | |
|---|---|---|---|
| | 4 QAM | 16 QAM | 64 QAM |
| $1\times10^{-1}$ | -89.3 | -83.5 | -77.3 |
| $1\times10^{-2}$ | -87.1 | -80.4 | -74.1 |
| $1\times10^{-3}$ | -85.6 | -78.6 | -72.3 |
| $1\times10^{-4}$ | -84.1 | -77.0 | -71.0 |
| $1\times10^{-5}$ | -83.1 | -76.0 | -69.9 |
| $1\times10^{-6}$ | -82.2 | -75.3 | -69.0 |
| $1\times10^{-7}$ | -81.6 | -74.6 | -68.4 |
| $1\times10^{-8}$ | -81.0 | -74.0 | -67.8 |
| $1\times10^{-9}$ | -80.5 | -73.5 | -67.2 |
| $1\times10^{-10}$ | -79.9 | -73.0 | -66.7 |
| $1\times10^{-11}$ | -79.6 | -72.6 | -66.3 |
| $1\times10^{-12}$ | -79.1 | -72.2 | -65.9 |

FIG. 23

|  | N(0) | N(1) | N(2) | ... | N(T-1) | N(T) | VARIATION RATE |
|---|---|---|---|---|---|---|---|
| W1 | 250 | 229 | 214 | ... | 206 | 220 | - |
| W2 | 51 | 39 | 41 | ... | 50 | 48 | - |
| ΔN(W1) | - | 21 | 13 | ... | ... | 14 | 3.2 |
| ΔN(W2) | - | 12 | 2 | ... | ... | 2 | 6.3 |

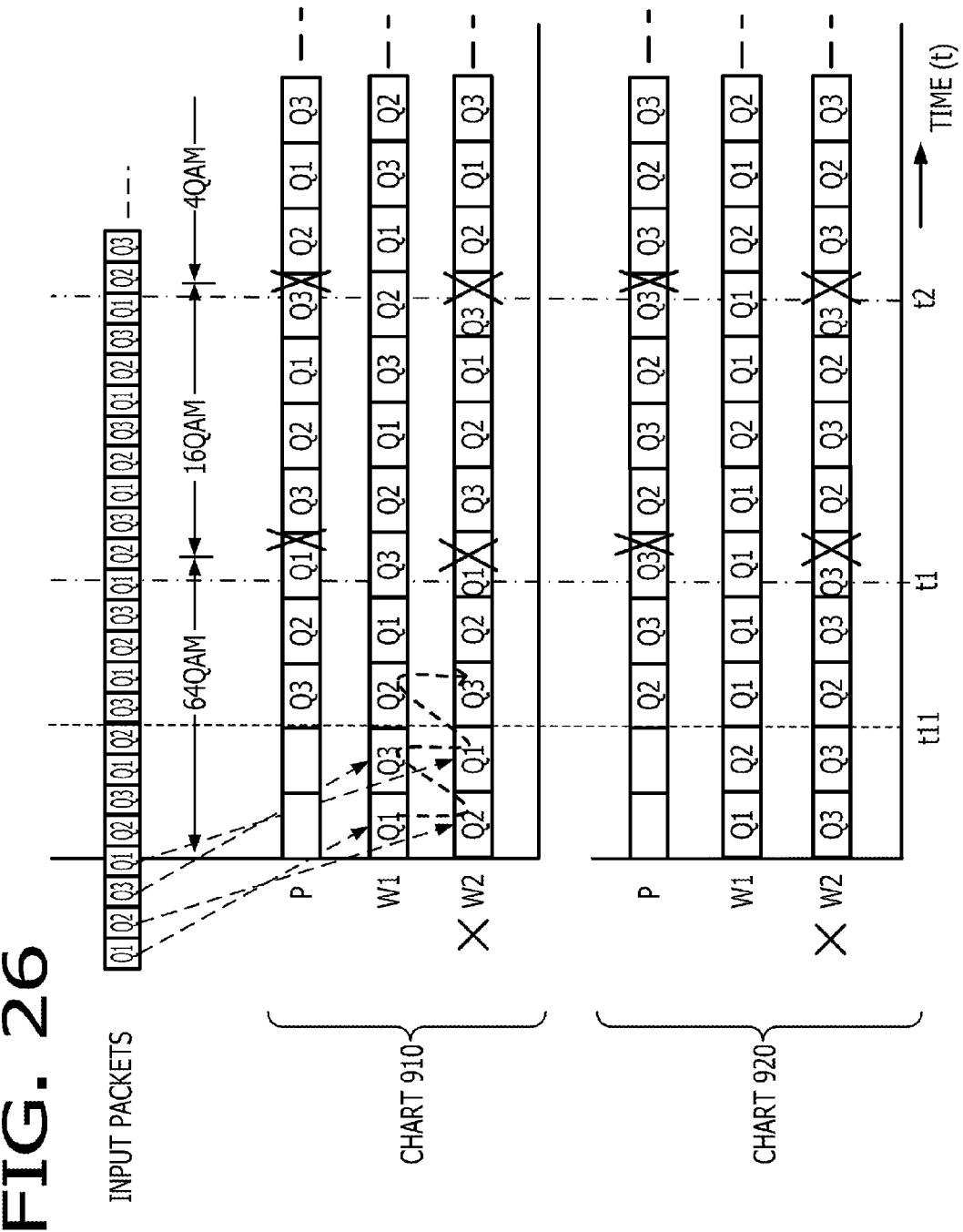

APPARATUS AND METHOD FOR ALLOCATING PACKETS TO A PLURALITY OF CARRIER WAVES

CROSS-REFERENCE TO RELATED APPLICATION

This application is based upon and claims the benefit of priority of the prior Japanese Patent Application No. 2010-160536, filed on Jul. 15, 2010, the entire contents of which are incorporated herein by reference.

FIELD

The present invention relates to a communication apparatus and method for allocating packets to a plurality of carrier waves.

BACKGROUND

As one of radio-communication techniques, a LA (Link Aggregation) method has been used in which plural carrier waves having different frequencies are bundled together to form a single logical link for transmitting data. For example, a radio-communication apparatus may be configured to transmit packets to a node to which the radio-communication apparatus is linked, using both carrier waves W1 and W2 that have frequencies f1 and f2, respectively. This allows the radio-communication apparatus to increase a transmission bandwidth available.

Quality of a radio wave that is transmitted and received via a radio link by a radio-communication apparatus may be influenced by a line-quality of the radio link, and, especially, may be significantly affected by the radio propagation environments, such as a frequency-selective fading and weather conditions. Therefore, unlike a communication apparatus that performs data transmission using a wired line, a radio-communication apparatus has difficulty in assuring a consistent transmission-quality.

In response, a ACM (Adaptive Code Modulation) method has been applied to radio-communication apparatuses in recent years. According to the ACM method, for example, in the case where a radio link has a higher line-quality, the radio-communication apparatus modulates packet data using a 64QAM (Quadrature Amplitude Modulation) method that enables a high-capacity data transmission. Meanwhile, in the case where the radio link has a lower line-quality, the radio-communication apparatus modulates packet data using a 4QAM method that enables a stable radio-communication though a capacity for data transmission becomes small. In this way, the ACM method allows a radio-communication apparatus to select a modulation method that is suitable for the current line-quality, thereby allowing efficient data transmission.

As a method for performing efficient packet transmission in a upstream direction (from a terminal to a base station), for example, Japanese Laid-open Patent Publication No. 2004-129085 discloses a radio-communication system in which a terminal notifies a base station, via an uplink channel, of transmission characteristic information for transmitting data in an upstream direction to a base station, and the base station performs scheduling process in which resources are allocated efficiently based on the notified transmission characteristic information.

In some cases, a packet may be assigned a QoS (Quality of Service) level. For example, for packets having a high-priority QoS level, a stable data-transmission is required so that data transmission is not interrupted. However, according to a known radio-communication apparatus, a packet that is to be transmitted by radio signal is allocated to a plurality of carrier waves in round-robin fashion. Therefore, in some cases, a radio-communication apparatus may allocate a packet having a high QoS level to a radio carrier-wave that is in a state of low line-quality, thereby causing a problem that a stable radio-transmission may not be performed on a packet having a high QoS level.

Further, a line-quality may deteriorate in a small amount of time. In this case, the radio-communication apparatus may fail to change a modulation method in response to the deterioration of the line-quality, and packets having a high QoS level may be transmitted using a modulation method suitable for a high capacity of data transmission. This causes a problem that a stable radio-transmission may not be performed on packets having a high priority QoS level.

SUMMARY

According to an aspect of an embodiment, there is provided a communication apparatus and method for allocating packets to a plurality of carrier waves via which the packets are transmitted to another communication apparatus. The communication apparatus includes a receiver, a calculator, and an allocator. The receiver is configured to receive, from the another communication apparatus, a current line-quality value for each of the plurality of carrier waves. The calculator configured to calculate, for the each of the plurality of carrier waves, a tolerance parameter indicating a tolerable margin of the current line-quality value for causing a change of a modulation method that is to be used for the each of the plurality of carrier waves, based on the received current line-quality value. The allocator is configured to allocate packets staying in the allocator to the plurality of carrier waves, based on a service-quality level assigned to each of the packets and the tolerance parameter calculated for each of the plurality of carrier waves, such that a first packet having the service-quality level equal to or higher than a second packet is allocated, on a priority basis, to a first carrier wave having the tolerance parameter equal to or larger than a second carrier wave to which the second packet is allocated.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 6 is a diagram illustrating an example of an error-tolerance table;

FIG. 15 is a diagram illustrating an example of a carrier-wave status table, according to a second embodiment;

FIG. 16 is a schematic diagram illustrating an example of a priority order for allocating packets to a plurality of carrier waves, according to a second embodiment;

FIG. 19 is a diagram illustrating an example of line-quality values for assuring a target error-rate using each of modulation methods;

FIG. 23 is a diagram illustrating an example of a carrier-wave status table, according to a fourth embodiment;

FIG. 26 is a schematic diagram illustrating an example of an operation sequence for allocating packets to a plurality of carrier waves, according to an fifth embodiment.

DESCRIPTION OF EMBODIMENTS

Figure 1:
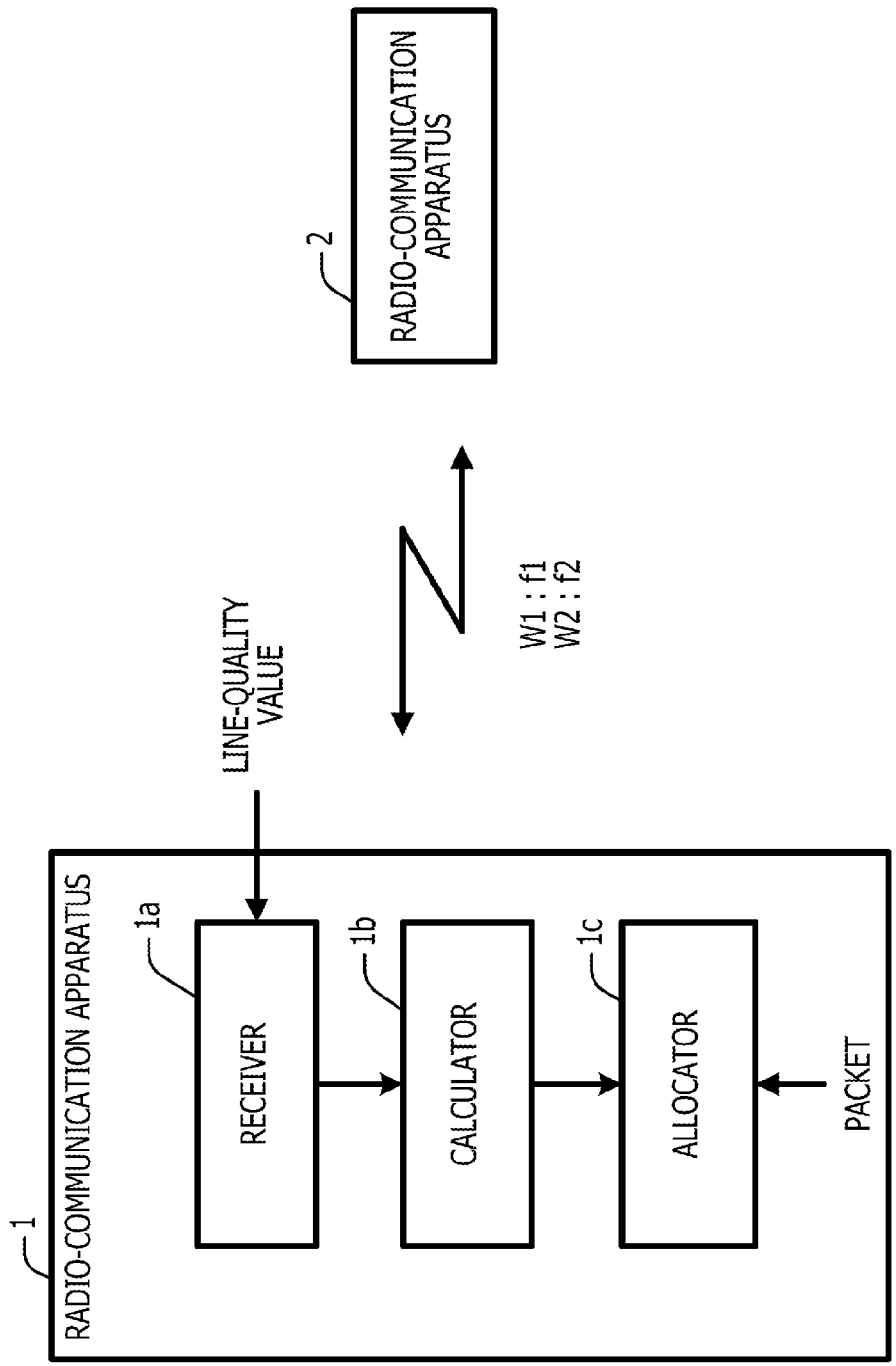
FIG. 1 is a schematic diagram illustrating a configuration example of a radio-communication apparatus, according to an embodiment.

FIG. 1 is a schematic diagram illustrating a configuration example of a radio-communication apparatus, according to an embodiment. FIG. 1 illustrates radio-communication apparatus 1 and 2 each performing an adaptive modulation using two radio carrier-waves W1, W2, that have frequencies f1, f2, respectively. Radio-communication apparatuses 1, 2 perform a radio-communication using different modulation methods for each of radio carrier-waves W1, W2, so as to assure a predetermined target error rate. The different modulation methods include, for example, a 64QAM method, a 16QAM method, and a 4QAM method. Hereinafter, description will be given under the assumption that radio-communication apparatus 1 is being operated as a transmitting-side apparatus, and radio-communication apparatus 2 is being operated as a receiving-side apparatus. Hereinafter, for ease of explanation, "a radio carrier-wave" and "radio carrier-waves" will be also simply expressed as "a carrier wave" and "carrier waves", respectively.

As depicted in FIG. 1, radio-communication apparatus 1 may be configured to include receiver 1a, calculator 1b, and allocator 1c. Receiver is receives line-quality information for each of carrier waves W1, W2, from radio-communication apparatus 2 serving as a receiving-side apparatus. The line-quality information may be configured to include as a current line-quality value, for example, a C/N (Carrier to Noise) value.

Calculator 1b may be configured to calculate a tolerable margin of the line-quality received by receiver 1a, for causing a change of a modulation method to be used for each of wave carriers W1, W2. For example, when a current line-quality value for a carrier wave, which has been received from radio-communication apparatus 2, has dropped to a predetermined limiting value "n", radio-communication apparatus 1 changes a first modulation method currently being used for the carrier wave, to a second modulation method in which a smaller number of bits are transmitted per unit-time so as to assure a target error-rate that was set beforehand. Calculator 1b calculates, for each of carrier waves W1, W2, the difference between the received current line-quality value and the predetermined limiting value "n" at which the first modulation method is to be changed, as a tolerable margin of a line-quality for causing a change of a modulation method to be used.

Allocator 1c may be configured to allocate a packet having a service quality highest among packets staying in allocator 1c, on a priority basis, to a carrier wave that is selected from a plurality of carrier waves in descending order of the calculated tolerable margins, that is, to one of carrier waves W1, W2 that has a larger tolerable margin calculated by calculator 1b. Here, for example, it is assumed that a tolerable margin of a line-quality with respect to carrier wave W1 is larger than a tolerable margin of a line-quality with respect to carrier wave W2. In this case, allocator is allocates a packet having a service-quality level highest among packets staying in allocator 1c, on a priority basis, to carrier wave W1 so as to preferentially transmit a packet having a high service quality level.

In this way, radio-communication apparatus 1 receives a current line-quality value for each of carrier waves W1, W2, and calculates a tolerable margin of the current line-quality value for causing a change of a modulation method to be used. Then, radio-communication apparatus 1 allocates a packet having a service-quality level, such as a QoS level, that is highest among packets staying in radio-communication apparatus 1, on a priority basis, to one of carrier waves W1, W2 that has a larger tolerable margin of the current line-quality value. This allows radio-communication apparatus 1 to perform stable radio-transmission on packets having a high QoS level.

Figure 2:
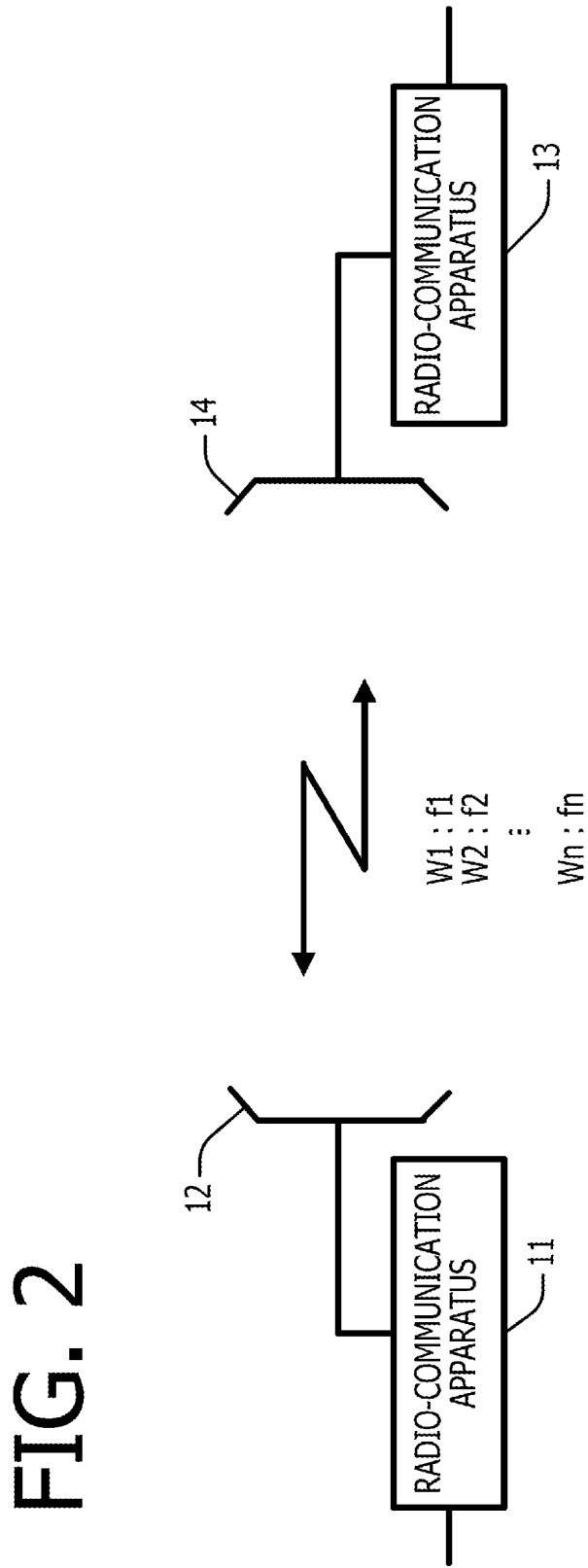
FIG. 2 is a schematic diagram illustrating a configuration example of a radio-communication system, according to an embodiment.

FIG. 2 is a schematic diagram illustrating a configuration example of a radio-communication system, according to an embodiment. The radio-communication system of FIG. 2 includes radio-communication apparatuses 11 and 13 that have antennas 12 and 14, respectively.

Radio-communication apparatuses 11, 13 each may be configured to perform a radio-communication using a Link Aggregation (LA) method. For example, as depicted in FIG. 2, each of radio-communication apparatuses 11, 13 performs a radio-communication using a plurality of carrier waves: carrier wave W1 having frequency f1, carrier wave W2 having frequency f2, . . . , and carrier wave Wn having frequency fn. Hereinafter, for ease of explanation, description will be given under the assumption that each of radio-communication apparatuses 11, 13 performs a radio-communication using two carrier waves: carrier wave W1 having frequency f1, and carrier wave W2 having frequency f2.

Radio-communication apparatus 11, for example, receives a packet including QoS information, as a service-quality level, from a wired network. Radio-communication apparatus 11 modulates the received packet, performs a frequency conversion on the modulated packet, and transmits the frequency-converted packet by radio signal, for example, by a microwave signal, to radio-communication apparatus 13 via a feeder and antenna 12.

Each of radio-communication apparatuses 11, 13 may be configured to include an ACM function, and to change a modulation method and a demodulation method depending on a line-quality of each of radio-links between antennas 12 and 14. For example, when a current line-quality value of carrier wave W1 is high and a current line-quality value of carrier wave W2 is low, radio-communication apparatus 11 on the transmitting side performs, via carrier wave W1, radio-transmission on a packet that was modulated using a 64QAM method, and performs, via carrier wave W2, radio-transmission on a packet that was modulated using a 16QAM method. Meanwhile, radio-communication apparatus 13 on the receiving side demodulates a packet that was transmitted via each of carrier waves 1, 2 using a demodulation method complying with the modulation method that is used by radio-communication apparatus 11 on the transmitting side.

Radio-communication apparatus 13 receives, for example, a packet in the form of a microwave signal via antenna 14 and a feeder, and demodulates the packet. Radio-communication apparatus 13 transmits the demodulated packet, for example, to a wired network.

Figure 3:
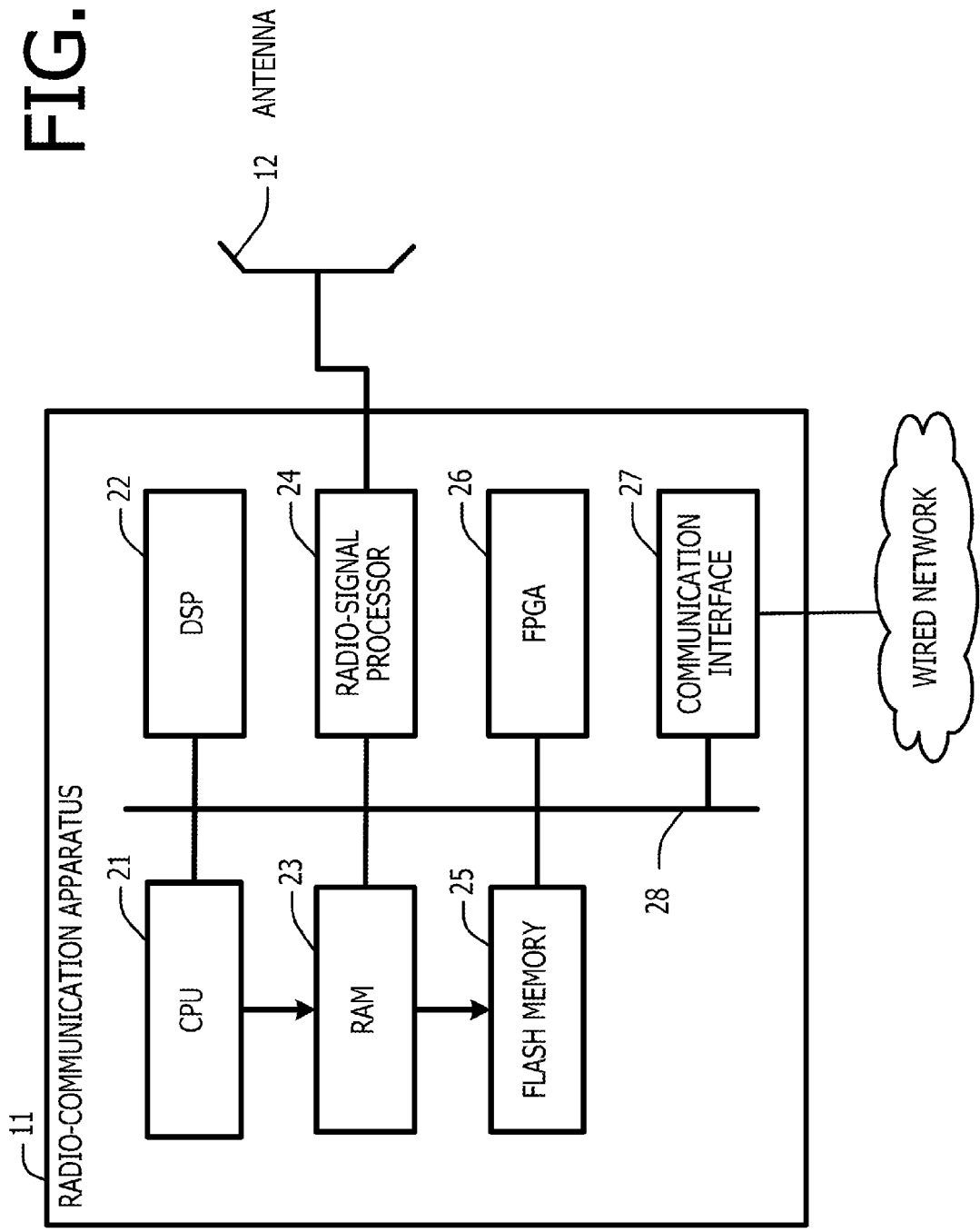
FIG. 3 is a diagram illustrating an example of a hardware configuration of a radio-communication apparatus, according to an embodiment.

FIG. 3 is a diagram illustrating an example of a hardware configuration of a radio-communication apparatus, according to an embodiment. As depicted in FIG. 3, radio-communication apparatus 11 may be configured to include CPU (Central Processing Unit) 21, DSP (Digital Signal Processor) 22, RAM (Random Access Memory) 23, radio-signal processor 24, flash memory 25, FPGA (Field Programmable Gate Array) 26, communication interface 27, and bus 28.

CPU 21 controls the entirety of radio-communication apparatus 11. CPU 21 may be connected, via bus 28, to various components such as DSP 22. DSP 22, for example, allocates a packet that has been received via communication interface 27 from a wired network, to one of radio-carrier waves W1, W2 based on QoS information included in the packet. DSP 22 may be configured to serve as allocator is of FIG. 1.

RAM 23 temporally stores data that have been processed by CPU 21, DSP 22, FPGA 26, or radio-signal processor 24. Radio-signal processor 24 performs radio-signal processing on a packet (data) that is to be transmitted, by radio-signal, to radio-communication apparatus 13. Radio-signal processor 24 performs, for example, BB (Base Band)-signal processing, modulation processing, and frequency-conversion processing. Radio-signal processor 24 further performs radio-signal processing on a radio-signal that has been received from radio-communication apparatus 13. For example, radio-signal processor 24 performs, on the received radio-signal, frequency-conversion processing, demodulation processing, and BB (Base Band)-signal processing. Radio-signal processor 24 further receives line-quality information for each of carrier waves, from radio-communication apparatus 2 serving as a receiving-side apparatus, and may be configured to serve as receiver is of FIG. 1. Radio-signal processor 24 may be implemented, for example, using a one-chip semiconductor device.

Flash memory 25 stores program codes executed by CPU 21 or DSP 22. Flash memory 23 further stores data that are to be processed by CPU 21 or DSP 22, and the data that have been processed by CPU 21 or DSP 22. Flash memory 25 may be implemented using a HDD (Hard Disk Drive).

FPGA 26 calculates a tolerance parameter based on a current line-quality value that has been transmitted from radio-communication apparatus 13 linked to radio-communication apparatus 11, as will be described later. Here, FPGA 26 may be configured to serve as calculator 1b of FIG. 1. FPGA 26 further stores the calculated tolerance parameter in RAM 26.

Communication interface 27 may be connected to a wired network. Communication interface 27, for example, transmits and receives packets via Ethernet. Packets that have been received by communication interface 27 are transmitted by radio signal to radio-communication apparatus 13. Meanwhile, packets that have been received from radio-communication apparatus 13 are transmitted to the wired network via communication interface 27.

Each component included in radio communication apparatus 11 may be replaced with another component having the same function as the each component. For example, DSP 22 may be implemented using a FPGA in view of cost-efficiency. Further, it is also possible to implement FPGA 26 using a DSP.

Radio-communication apparatus 13 may be configured in a manner similar to radio-communication apparatus 11 depicted in FIG. 3. Hereinafter, for ease of explanation, description will be given under the assumption that radio-communication apparatus 11 serves as a transmitting-side communication apparatus, and radio-communication apparatus 13 serves as a receiving-side communication apparatus.

Figure 4:
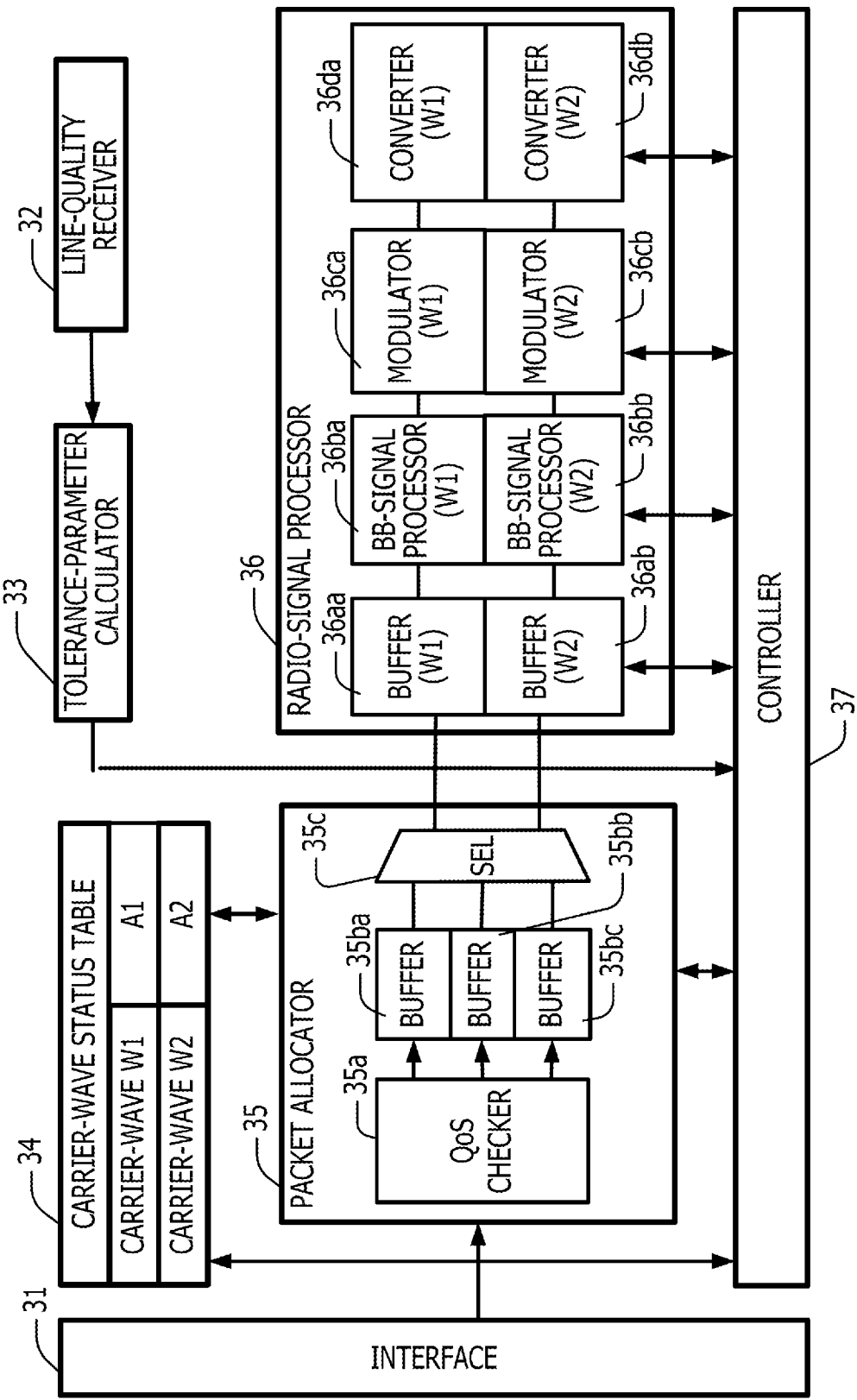
FIG. 4 is a diagram illustrating a configuration example of a radio-communication apparatus, according to a first embodiment.

FIG. 4 is a diagram illustrating a configuration example of a communication apparatus, according to a first embodiment. As depicted in FIG. 4, radio-communication apparatus 11 may be configured to include IF (InterFace) 31, line-quality receiver 32, tolerance-parameter calculator 33, carrier-wave status table 34, packet allocator 35, radio-signal processor 36, and controller 37.

IF 31 receives packets from a wired network, for example, via an Ethernet. IF 31 may be, for example, implemented as communication interface 27 depicted in FIG. 3.

Line-quality receiver 32 receives a current line-quality value for each of a plurality of carrier waves, from radio-communication apparatus 13 serving as a receiving-side apparatus. Radio-communication apparatus 13 on the receiving-side calculates a current line-quality value for each of the plurality of carrier waves, based on radio-signals received from radio-communication apparatus 11 on the transmitting-side, and transmits the calculated current line-quality value to radio-communication apparatus 11 on the transmitting-side, for example, on a periodic basis. The current line-quality value may be, for example, a C/N (carrier-to-noise ratio) value indicating a ratio of the received modulated carrier-signal power C to the received noise power N. Line-quality receiver 32 may be implemented, for example, as radio-signal processor 24 depicted in FIG. 3.

Tolerance-parameter calculator 33 calculates a tolerance parameter for each of the plurality of radio carrier waves based on the current line-quality value received by line-quality receiver 32. Tolerance-parameter calculator 33 stores, in carrier-wave status table 34, the calculated tolerance parameter in association with each of the plurality of carrier waves. Tolerance parameter calculator 33 may be implemented, for example, as FPGA 26 depicted in FIG. 3.

Here, description will be given of a tolerance parameter. First, description of changing a modulation method will be given. Although a modulation method may be changed for each of a plurality of carrier waves, in the following description, for ease of explanation, description will be given without distinction between radio the plurality of carrier waves.

Figure 5:
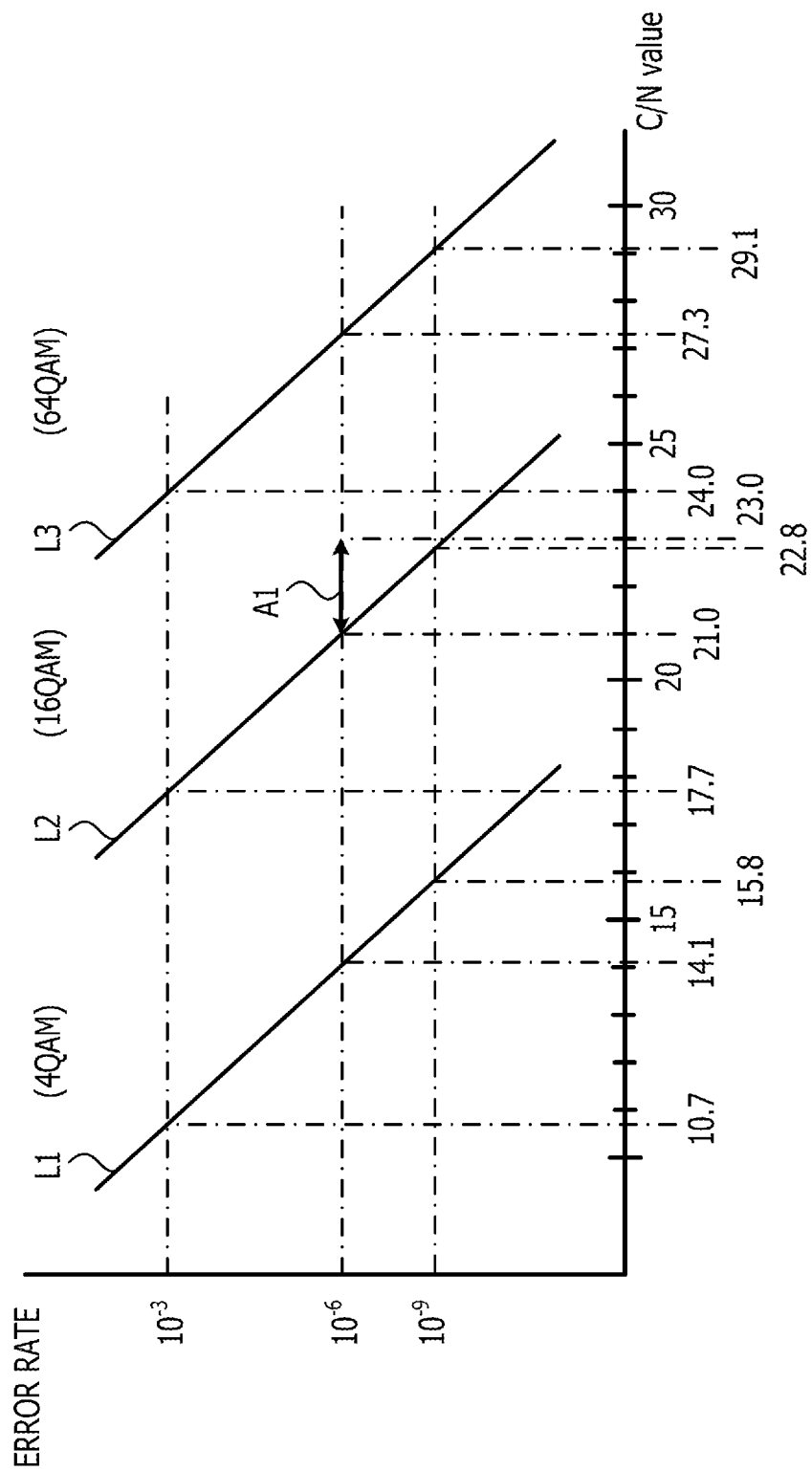
FIG. 5 is a schematic diagram illustrating an example of a tolerable margin of a current line-quality value for causing a change of a modulation method.

FIG. 5 is a schematic diagram illustrating an example of a tolerable margin of a current line-quality value for causing a change of a modulation method. In the graph depicted in FIG. 5, the horizontal axis indicates a C/N (dB) value, and the vertical axis indicates an error rate. In FIG. 5, strait line L1 indicates an error tolerance for a 4QAM method, strait line L2 indicates an error tolerance (correlation between error rates and C/N values) when using a 16QAM method, and straight line L3 indicates an error tolerance when using a 64QAM method.

As depicted by straight lines L1 to L3, for each of modulation methods, the larger the C/N value is, the smaller the error rate is. That is, the larger the ratio of the carrier-signal power C to the received noise power N (the C/N value) is, the smaller the error rate is. Whereas, the larger the number of bits that are transmittable per symbol by radio signal is (in other words, the larger the value "x" included in modulation method name "xQAM" is), the larger the error rate is.

Radio-communication apparatus 11 on the transmitting side may be configured to perform radio-transmission on data by changing a modulation method so that radio-communication apparatus 13 on the receiving side assures an error rate equal to or smaller than a predetermined value (that is, a target error rate). For example, it is assumed that radio-communication apparatus 11 on the transmitting side performs radio-transmission so that radio-communication apparatus 13 on the receiving side assures an error rate equal to or smaller than a target error rate of $10^{-6}$. Further, it is also assumed that radio-communication apparatus 11 on the transmitting side is currently performing radio-transmission using a modulation method of 16QAM.

In this case, when the current C/N value received from radio-communication apparatus 13 on the receiving side becomes smaller than the value "21.0", radio-communication apparatus 11 on the transmitting side changes a modulation method thereof from the 16QAM method to a 4QAM method, by referring to straight line L2 of FIG. 5 That is, a radio-communication apparatus on the transmitting side changes a modulation method thereof, though the number of bits that are transmittable per symbol by radio signal becomes smaller, from the 16QAM method to a 4QAM method so that an error rate equal to or smaller than the target error rate of $10^{-6}$ is assured.

Next, description will be given of a tolerance parameter. A tolerance parameter indicates a tolerable margin of a current line-quality value for causing a change of a modulation method. That is, the tolerance parameter indicates the size of a tolerable range of a current line-quality value at which a change of a modulation method is not needed.

For example, in a manner similar to the above mentioned example, it is assumed that radio-communication apparatus 11 on the transmitting side performs radio-transmission so that radio-communication apparatus 13 on the receiving side assures an error rate equal to or smaller than the target error rate of $10^{-6}$. It is also assumed that radio-communication apparatus 11 on the transmitting side is performing radio-transmission using a modulation method of 16QAM. In this case, as mentioned in the above example, radio-communication apparatus 11 on the transmitting side changes a modulation method thereof from the 16QAM method to a 4QAM method when a current C/N value received from radio-communication apparatus 13 on the receiving side becomes smaller than value "21.0".

In this case, when a current C/N value received from radio-communication apparatus 13 on the receiving side is "23.0", a tolerable margin of the current line-quality value for causing a change of a modulation method becomes "2.0" by subtracting "21.0" from "23.0", as depicted by two-headed arrow A1 in FIG. 5. That is, the tolerance parameter, which indicates the size of a tolerable range of a current line-quality value at which a change of a modulation method is not needed, becomes "2.0".

FIG. 6 is a diagram illustrating an example of an error-tolerance table. The error-tolerance table stores line-quality values for assuring a target error rate when using each of modulation methods. The error-tolerance table of FIG. 6 indicates the case where a current C/N value is used as a current line-quality value. As depicted in FIG. 6, the error-tolerance table includes a column of a "BER" (Bit Error Rate) value, and a column of a "C/N" value for each of modulation methods. Column "BER" stores an error rate, and column "C/N" of each of the modulation methods stores the smallest "C/N" value for assuring the "BER" value associated therewith.

For example, in the case of a modulation method of "64QAM", it is seen from the error-tolerance table of FIG. 6 that a "C/N" value equal to or larger than "27.3" is needed for assuring an error rate equal to or smaller than the "$10^{-6}$". Further, in the case of a modulation method of "16QAM", it is seen from the error-tolerance table of FIG. 6 that a "C/N" value equal to or greater than "21.0" is needed for assuring the error rate equal to or smaller than "$10^{-6}$".

The graph depicted in FIG. 5 may be obtained by representing the error-tolerance table of FIG. 6 in graph form. Radio-communication apparatus 11 may be configured to store an error-tolerance table of FIG. 6 in RAM 23 or flash memory 25, and to change a modulation method thereof with reference to the stored error-tolerance table.

Here, the description returns to FIG. 4. Tolerance-parameter calculator 33 calculates a tolerance parameter based on the following formula (1), in the case of using "a current C/N value" as a current line-quality value.

$$(\text{tolerance parameter}) = (\text{current C/N value}) - (\text{target C/N value}) \quad (1)$$

Here, "current C/N value" of formula (1) indicates a current C/N value that was measured by radio-communication apparatus 13 on the receiving side, and is acquired from line-quality information that is transmitted from radio-communication apparatus 13 on the receiving side. Hereinafter, "tolerance parameter" that is obtained by using a current C/N value as a current line-quality value will be also expressed as "C/N-tolerance parameter".

In the formula (1), "target C/N value" is a C/N value corresponding to a target error rate that is beforehand set for radio-transmission between radio-communication apparatuses 11 and 13, and is acquired by referring to C/N values that are stored, in the error-tolerance table, in association with the modulation method that is currently being used for radio-transmission.

For example, it is assumed that a target error rate for radio-transmission between radio-communication apparatus 11 and 13 is set at value "$10^{-6}$". Further, it is also assumed that radio-communication apparatus 11 is performing radio-transmission using a modulation method of 16QAM. In this case, tolerance-parameter calculator 33 may acquire target C/N value "21.0" by referring to C/N values that are stored, in the error-tolerance table of FIG. 6, in association with error rate "$10^{-6}$" and a modulation method "16QAM". Further, when radio-communication apparatus 11 is performing radio-transmission using a 64QAM method, radio-communication apparatus 11 may acquire target C/N value "27.3" by referring to the error-tolerance table of FIG. 6, in the similar manner.

Carrier-wave status table 34 stores a tolerance parameter for each of carrier waves. For example, as depicted in FIG. 4, carrier-wave status table 34 stores tolerance parameter "A1" for carrier wave "W1" and tolerance parameter "A2" for carrier wave "W2". Carrier-wave status table 34 may be implemented, for example, using RAM 23 that was described with reference to FIG. 3.

Packet allocator 35 may be configured to include QoS checker 35a, buffers 35ba, 35bb, 35bc, and SEL (selector) 35c. Packet allocator 35 allocates a packet that has been received via IF 31, to a plurality of carrier waves by referring to carrier-wave status table 34. Packet allocator 35 may be implemented, for example, using DSP 22 that was described with reference to FIG. 3.

QoS checker 35a checks a QoS level assigned to the packet received via IF 31. QoS checker 35a outputs the received packet to one of buffers 35ba, 35bb, 35bc according to the QoS level assigned to the received packet.

Buffers 35ba, 35bb, 35bc temporarily stores the packet that have been output from QoS checker 35a, and output the packet to SEL 35c. Here, buffers 35ba, 35bb, 35bc are configured to correspond to different QoS levels, respectively.

For example, it is assumed that QoS levels of a packet are defined by three priority levels: a high level, a medium level, and a low level. In this case, buffers 35ba, 35bb, and 35bc may be configured to correspond to the high level, the medium level, and the low level, respectively. QoS checker 35a identifies a QoS level assigned to the received packet among the three priority levels (the high, medium, and low levels), and then outputs packets having high, medium, and low QoS levels to buffers 35ba, 35bb, and 35bc, respectively.

SEL 35c, with reference to carrier-wave status table 34, sends packets stored in buffers 35ba, 35bb, 35bc to radio-signal processor 36 so that a packet having a QoS level highest among packets staying in packet allocator 35 is allocated, on a priority basis, to a carrier wave that has a larger tolerance parameter than the other carrier waves included in the plurality of carrier waves. In other words, a packet having the highest QoS level is allocated, on a priority basis, to a carrier wave that is first selected, form the plurality of carrier waves, in descending order of a tolerance-parameter.

For example, SEL 35c sends a first packet stored in buffer 35ba to radio-signal processor 36 so that the first packet is allocated, on a priority basis, to a carrier wave having the largest tolerance parameter. Further, when there exist no packets stored in buffer 35ba, SEL 35c sends a second packet stored in buffer 35bb to radio-signal processor 36 so that the second packet is allocated, on a priority basis, to a carrier wave having the greatest tolerance parameter value among the plurality of carrier waves. Meanwhile, when there exists a packet stored in buffer 35ba, SEL 35c sends the second packet stored in buffer 35bb to radio-signal processor 36 so that the second packet is allocated to a carrier wave having the second-largest tolerance parameter among the plurality of carrier waves.

Radio-signal processor 36 performs radio-signal processing on a packet that was allocated to each of carrier waves by packet allocator 35. Radio-signal processor 36 includes buffers 36aa, 36ab, BB-signal processors 36ba, 36bb, modulators 36ca, 36cb, and converters 36da, 36db. Radio-signal processor 36 may be, for example, implemented as radio-signal processor 24 depicted in FIG. 3.

Buffers 36aa, 36ab temporarily store packets that have been output from SEL 35c of packet allocator 35. Buffer 36 may be installed in association with each of a plurality of carrier waves. For example, in the example of FIG. 4, buffers 36aa, 36ab are installed in association with carrier waves W1, W2, respectively. In FIG. 4, parenthetic symbols W1, W2 indicate correspondences to carrier waves W1, W2, respectively.

BB-signal processor 36ba performs base-band signal processing on a packet that is temporarily stored in buffer 36aa. In the similar manner, BB-signal processor 36bb performs base-band signal processing on a packet that is temporarily stored in buffer 36ab.

Modulator 36ca performs modulation processing on a packet that has been processed by BB-signal processor 36ba. In the similar manner, modulator 36cb performs modulation processing on a packet that has been processed by BB-signal processor 36bb. Modulators 36ca, 36cb each modulates a packet that has undergone base-band signal processing, using one of modulation methods, such as a 64QAM method, a 16QAM, method, or a 4QAM method.

Converter 36da converts a frequency for packet data that has been modulated by modulator 36ca, into a carrier frequency for carrier wave W1. Converter 36db converts a frequency for packet data that has been modulated by modulator 36cb, into a carrier frequency for carrier wave W2.

Controller 37 performs data exchange among components, and controls each of the components. Controller 37 may be implemented, for example, using CPU 21 depicted in FIG. 3.

Next, descriptions will be given of allocation of a packet to a carrier wave. First, a description will be given of changing a modulation method.

Figure 7:
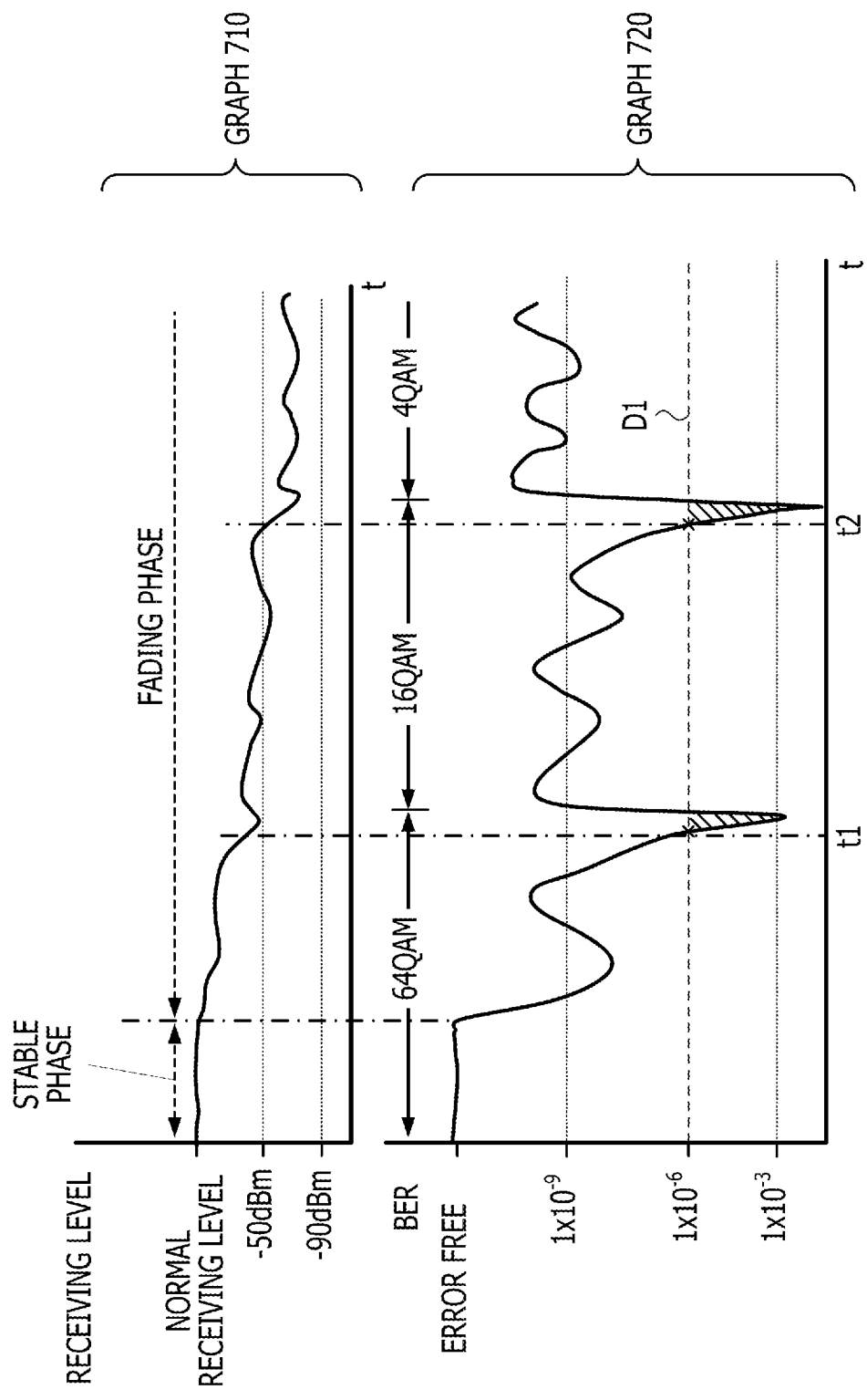
FIG. 7 is a schematic diagram illustrating an example of a case in which a modulation method is changed depending on line-quality.

FIG. 7 is a schematic diagram illustrating an example of a case in which a modulation method is changed depending on line-quality. In FIG. 7, two graphs (graphs 710, 720) are depicted in parallel using the same time scale. Graph 710 indicates a radio-signal level for carrier wave W2 that is received by radio-communication apparatus 13 on the receiving side. In graph 710, the horizontal axis indicates a time, and the vertical axis indicates a receiving level.

Graph 720 indicates an error rate for carrier wave W2 received by radio-communication apparatus 13 on the receiving side. In graph 720, the horizontal axis indicates a time, and the vertical axis indicates a bit error rate (BER). Here, it is assumed that a target error rate for a radio-link between apparatuses 11, 13 is set so that an error rate becomes equal to or less than the target error rate of $10^{-6}$ as depicted by dotted line D1. Therefore, radio-communication apparatus 11 on the transmitting side changes a modulation method when the current bit error rate exceeds error rate $10^{-6}$ so as to assure the target error rate $10^{-6}$.

Here, for example, it is assumed that transmission environment has shifted from a stable phase to a fading phase, as depicted in FIG. 7. And, it is also assumed that the bit error rate has exceeded $10^{-6}$ at time t1, as depicted in graph 720 of FIG. 7. In this case, radio-communication apparatus 11 on the transmitting side changes a modulation method from the 64QAM method to a 16QAM method so as to assure the target error rate $10^{-6}$, as depicted in FIG. 7. Further, it is also assumed that the bit error rate has exceeded $10^{-6}$ at time t2. In this case, radio-communication apparatus 11 on the transmitting side changes a modulation method from the 16QAM method to a 4QAM method so as to assure the target error rate $10^{-6}$, as depicted in FIG. 7. Meanwhile, when the bit error rate decreases at a value equal to or smaller than the error free level, radio-communication apparatus 11 on the transmitting side changes a modulation method thereof to a modulation method performing a higher degree of modulation.

Figure 8:
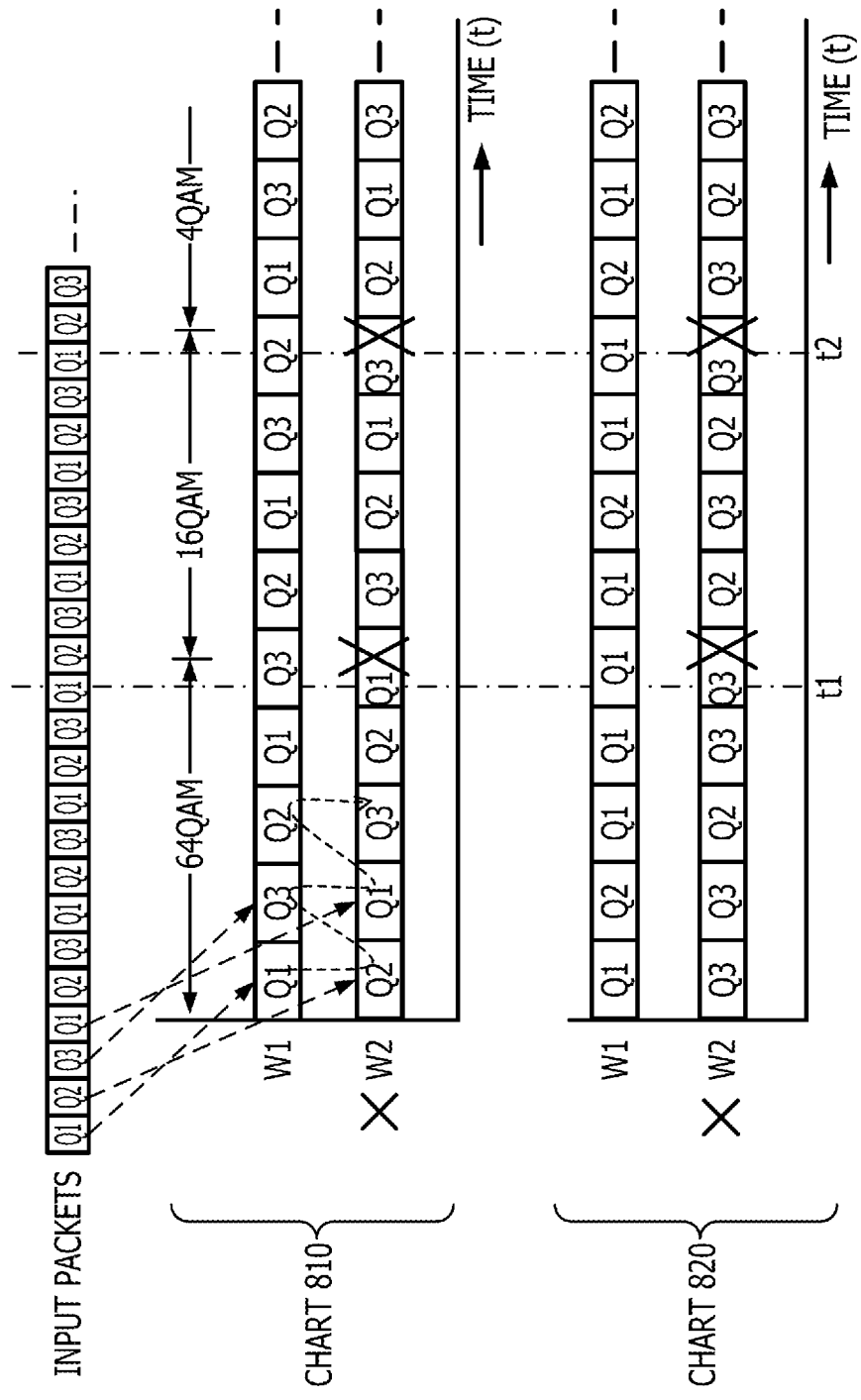
FIG. 8 is a schematic diagram illustrating an example of an operation sequence for allocating packets to a plurality of carrier waves, according to a first embodiment.

FIG. 8 is a schematic diagram illustrating an example of an operation sequence for allocating packets to a plurality of carrier waves, according to a first embodiment. In FIG. 8, packets received via IF 31 of FIG. 4 are depicted as "INPUT PACKETS". In FIG. 8, each of boxes indicates a packet, and each of symbols Q1, Q2, Q3 depicted in boxes represents a QoS level assigned to a packet indicated by the corresponding box. Q1, Q2, and Q3 indicate high, middle, and low QoS levels, respectively. Symbols W1, W2 indicates, respectively, carrier waves W1, W2 to which packets are to be allocated.

In FIG. 8, chart 810 illustrates a packet allocation method in which packets are allocated to carrier waves W1, W2 in round-robin fashion. The lower half part 820 illustrates a packet allocation method in which packets are allocated to carrier waves W!, W2 by packet allocator 35 described with reference to FIG. 4.

In FIG. 8, a horizontal axis depicted in each of charts 810, 820 indicates a time which is ticked on a time scale equal to that of FIG. 7. Therefore, times t1, t2 of FIG. 8 are equal to times t1, t2 of FIG. 7. It is assumed the error rate for carrier wave W2 changes as depicted in graph 720 of FIG. 7. Further, it is also assumed that carrier wave W1 is performing a stable radio-transmission, and the tolerance parameter of carrier wave W1 is larger than that of carrier wave W2.

When packets are allocated in round-robin fashion to carrier waves W1, W2, a packet having a high QoS level (for example, Q1) may be allocated, at time t1, to carrier W2 that may fail to assure the target error rate of $10^{-6}$, as depicted in chart 810 of FIG. 8.

Meanwhile, according to the first embodiment, packet allocator 35 of FIG. 4 allocates a packet having a high QoS level, on priority basis, to carrier wave W1 having a large tolerance parameter. Therefore, a packet having a high QoS level may be allocated, at times t1, t2, to carrier wave W1 having a high line-quality, as depicted in chart 820 of FIG. 8.

The line-quality may be sometimes deteriorated (the error rate increasing) in a short amount of time as depicted in FIG. 7. In this case, since radio-communication apparatus 11 fails to change a modulation method in synchronization with the deterioration of the line-quality, radio-communication apparatus 11 may change a modulation method in retard of times t1, t2 as depicted in FIGS. 7, 8. As a result, in the case of allocating packets to the plurality of carrier waves in round-robin fashion, a packet having a high QoS level might be transmitted using a modulation method for performing high-capacity transmission, there by deteriorating a line-quality. In contrast, according to the first embodiment, since packet allocator 35 of FIG. 4 allocates packets to the plurality of carrier waves based on the tolerance parameters, a stable line-quality may be kept even when the error rate changes in a short amount of time.

Next, descriptions will be given of operations performed by radio-communication apparatus 11 with reference to flow-charts.

Figure 9:
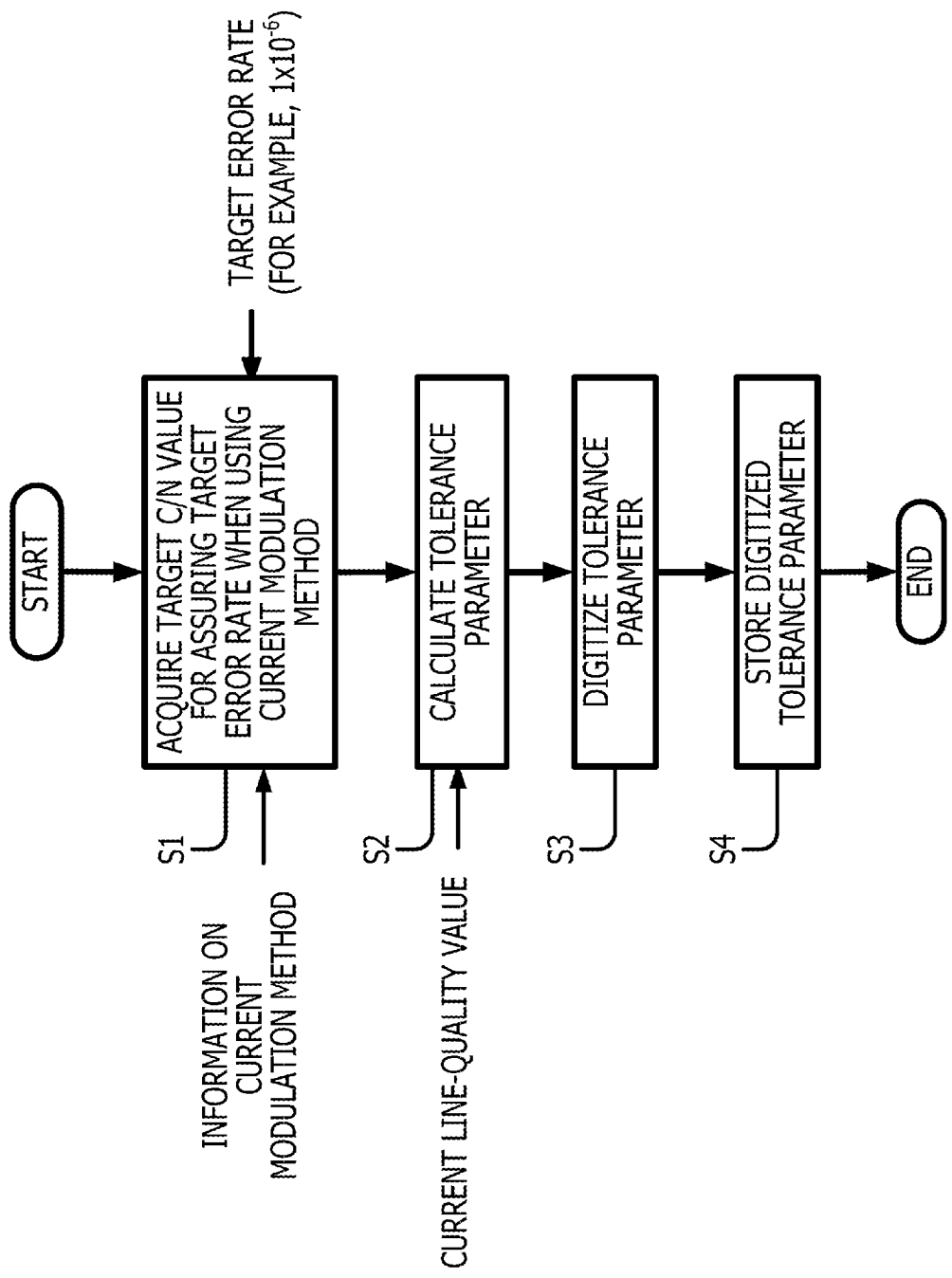
FIG. 9 is a diagram illustrating an example of an operational flowchart for calculating a tolerance parameter, according to a first embodiment.

FIG. 9 is a diagram illustrating an example of an operational flowchart for calculating a tolerance parameter, according to a first embodiment.

In operation S1, tolerance-parameter calculator 33 acquires, from controller 37, information on modulation methods currently being used for carrier waves W1, W2. Further, tolerance-parameter calculator 33 acquires, from controller 37, a target error rate indicating an error rate that is to be assured when performing radio-communication.

Controller 37 changes a modulation method to be used for each of a plurality of carrier waves based on a target error rate that is set beforehand. For example, when the target error rate is being set at $10^{-6}$, controller 37 changes a modulation method that is to be used by radio-signal processor 36 so that each of radio carrier waves W1, W2 assures error rate $10^{-6}$. Thus, tolerance-parameter calculator 33 is able to acquire, from controller 37, a target error rate and information on a modulation method that is currently being used for each of a plurality of carrier waves.

Next, tolerance-parameter calculator 33 acquires a current C/N value for assuring the target error rate when using the acquired modulation method. That is, tolerance-parameter calculator 33 acquires "target C/N value" described in the above-mentioned formula (1), by referring to the error-tolerance table depicted in FIG. 6 using the target error rate and the current modulation method that have been acquired from controller 37.

In operation S2, tolerance-parameter calculator 33 calculates a tolerance parameter based on a current line-quality value received by line-quality receiver 32 and a target C/N value acquired in operation S1, using the above-mentioned formula (1).

In operation S3, tolerance-parameter calculator 33 digitizes the calculated tolerance parameter. For example, tolerance-parameter calculator 33 digitizes the calculated tolerance parameter into an integer number ranging from 0 to 255.

In operation S4, tolerance-parameter calculator 33 stores the digitized tolerance parameter into carrier-wave status table 34. For example, tolerance-parameter calculator 33 stores, in carrier-wave status table 34, the digitized tolerance parameter in association with each of carrier waves W1, W2, as depicted in FIG. 4.

By performing the above-mentioned operations, a tolerance parameter are calculated for each of a plurality of carrier waves, and stored in carrier-wave status table 34. Here, the above-mentioned operations may be performed, for example, using FPGA 26 of FIG. 3.

Figure 10:
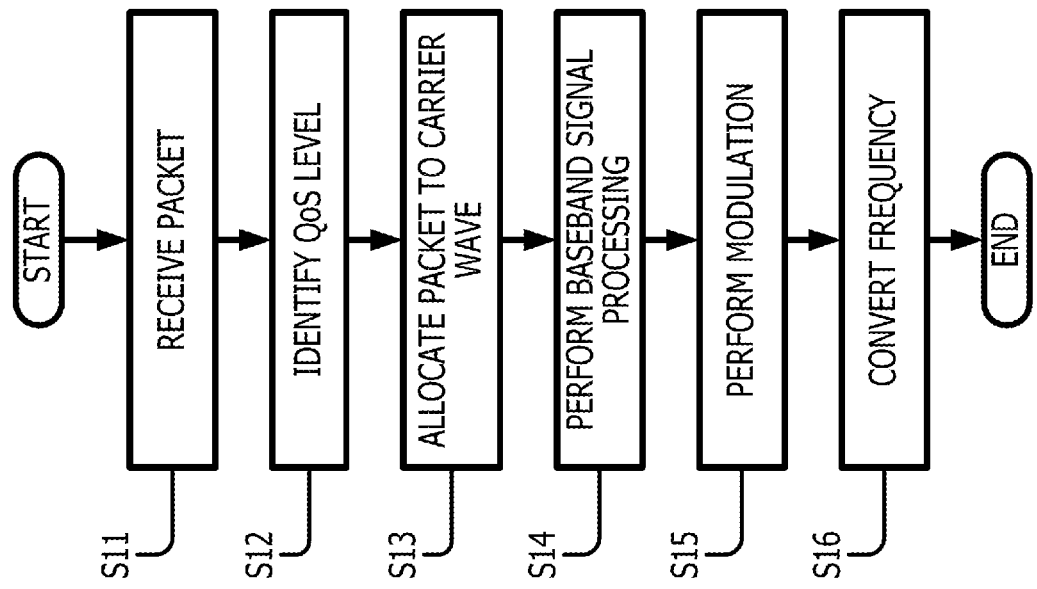
FIG. 10 is a diagram illustrating an example of an operational flowchart for performing a radio-signal processing on a packet, according to a first embodiment.

FIG. 10 is a diagram illustrating an example of an operational flowchart for performing a radio-signal processing on a packet, according to a first embodiment.

In operation S11, IF 31 receives a packet, for example, from a wired network.

In operation S12, QoS checker 35a of packet allocator 35 identifies a QoS level assigned to the received packet based on QoS information contained in the received packet, and allocates the received packet to one of buffers 35ba, 35bb, 35bc, according to the identified QoS level. For example, QoS checker 35a allocates the received packet to buffer 35ba when the received packet has a high QoS level, allocates the received packet to buffer 35bb when the received packet has a medium QoS level, and allocates the received packet to buffer 35bc when the received packet has a low QoS level.

In operation S13, SEL 35c sends a packet stored in each of buffers 35ba, 35bb, 35bc, to one of buffers 36aa, 36ab of radio-signal processor 36 so that a packet having a high QoS level is allocated, on apriority basis, to a carrier wave having a large tolerance parameter. The details of operation S13 will be given later with reference to FIGS. 11 to 13.

In operation S14, BB-signal processors 36*ba*, 36*bb* perform baseband signal processing on packets stored in buffers 36*aa*, 36*ab*, respectively.

In operation S15, modulators 36*ca*, 36*cb* perform modulation processing on the packets on which the baseband signal processing has been performed by BB-signal processors 36*ba*, 36*bb*, respectively.

In operation S16, converters 36*da*, 36*db* convert frequencies of the packet data modulated by modulators 36*ca*, 36*cb*, into carrier frequencies of carrier waves W1, W2, respectively.

By performing the above-mentioned operations, a packet having a high QoS level is allocated, on a priority basis, to one of carrier waves W1, W2 that has a large tolerance parameter, and then transmitted by radio-signal to radio-communication apparatus 13 on the receiving side. Here, the above-mentioned operations may be performed, for example, by communication interface 27, FPGA 26, DSP 22, and radio-signal processor 24 of FIG. 3.

Figure 11:
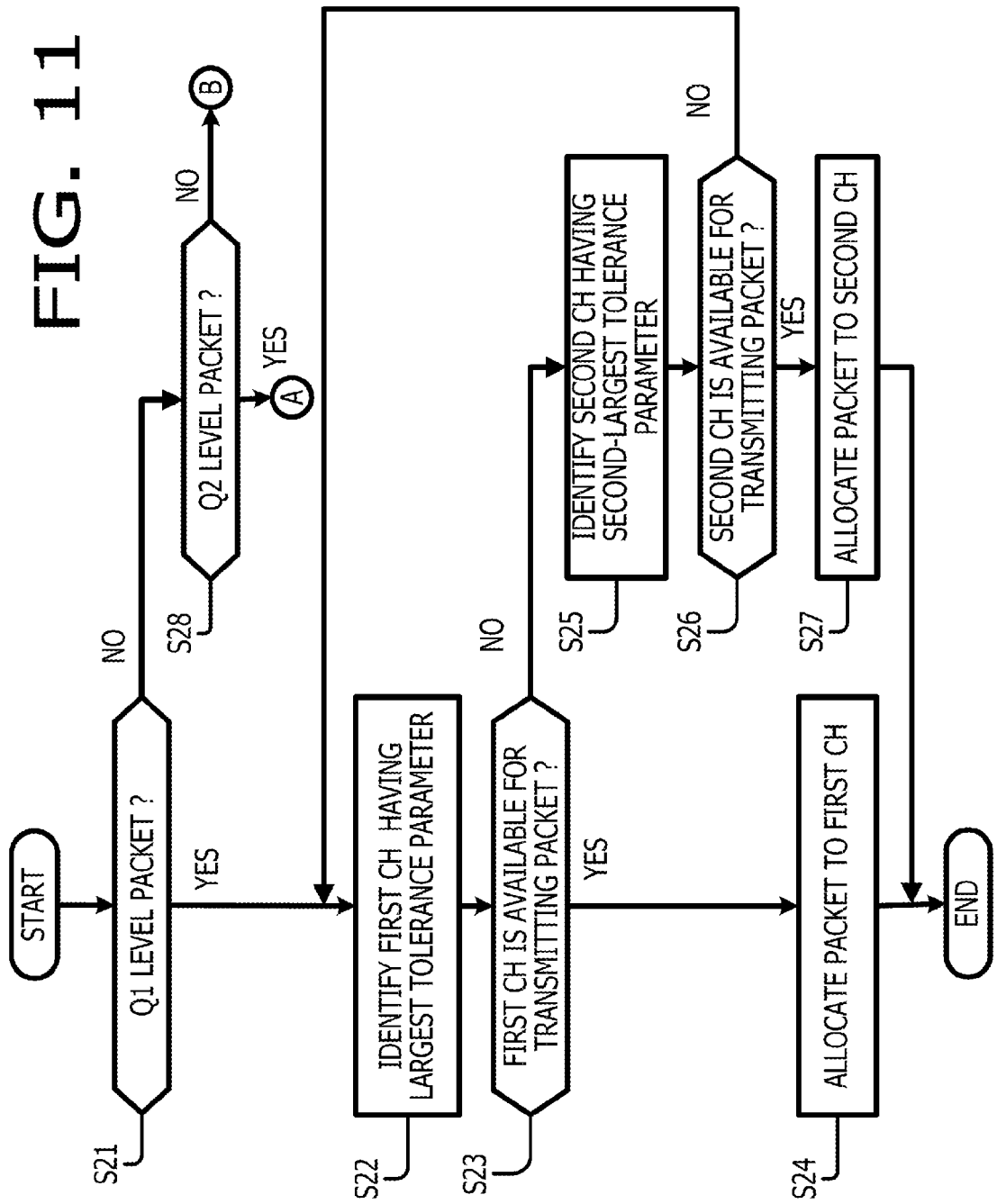
FIG. 11 is a diagram illustrating an example of an operational flowchart for allocating packets to a plurality of carrier waves, according to a first embodiment.
Figure 12:
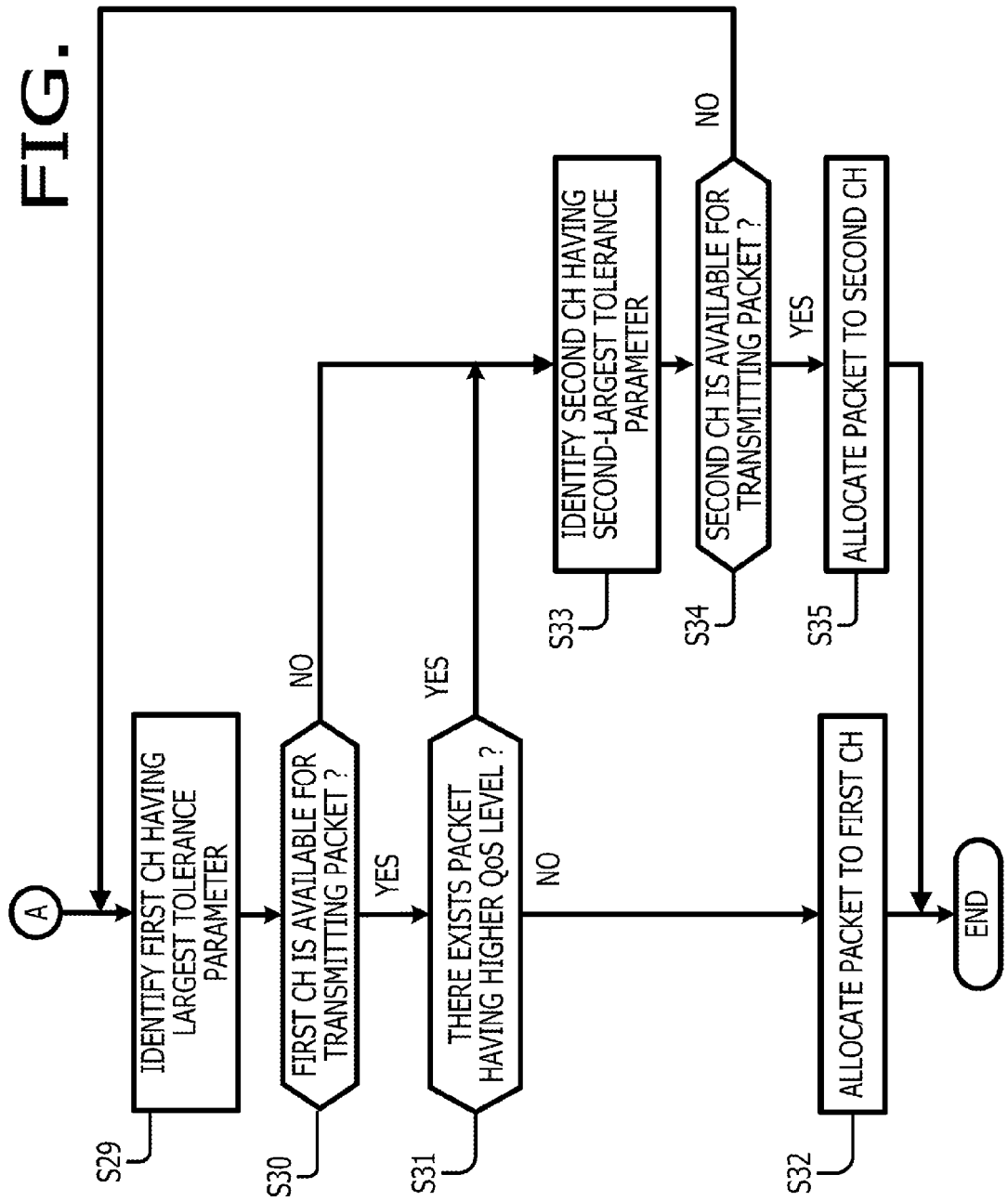
FIG. 12 is a diagram illustrating an example of an operational flowchart for allocating packets to a plurality of carrier waves, according to a first embodiment.
Figure 13:
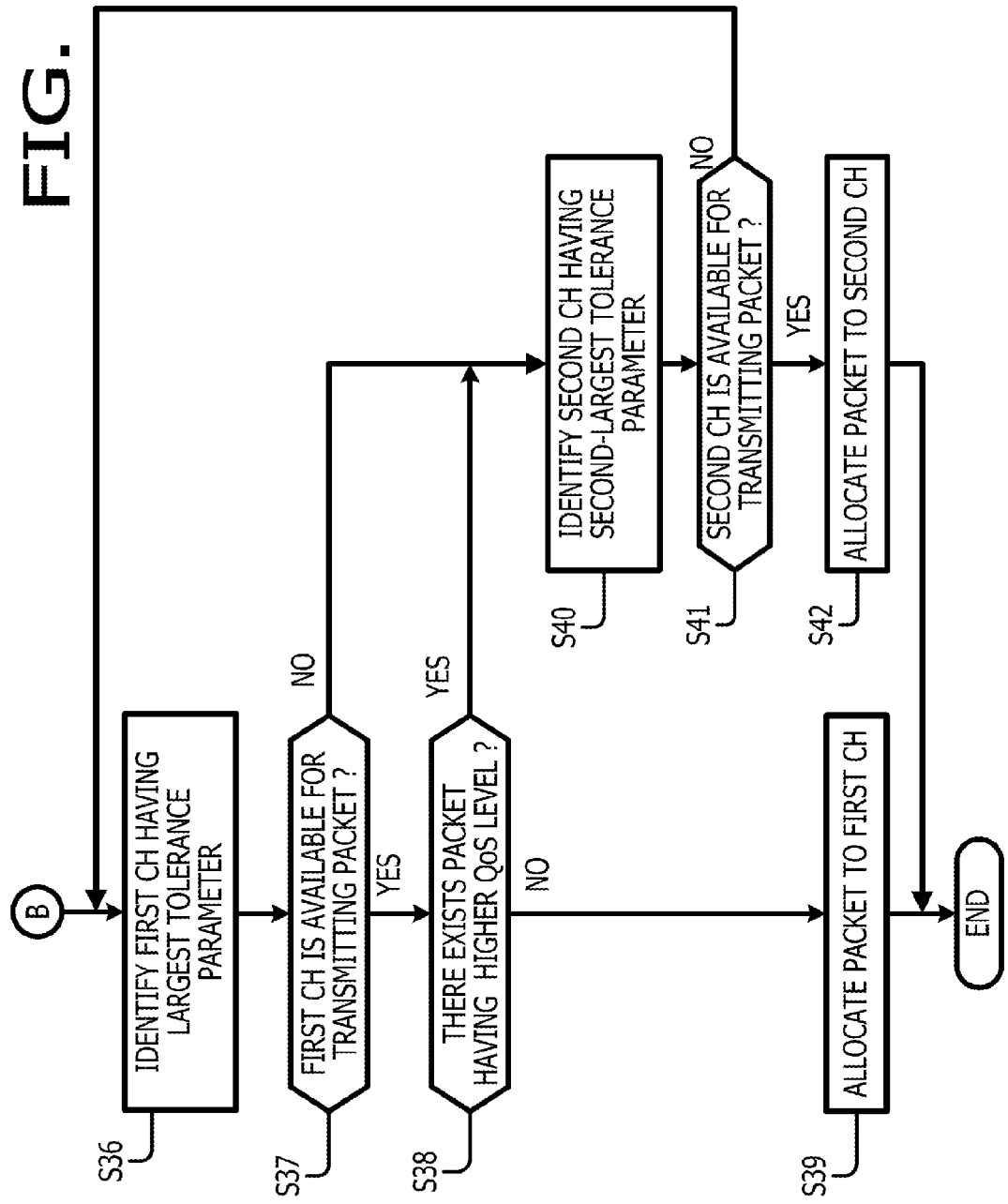
FIG. 13 is a diagram illustrating an example of an operational flowchart for allocating packets to a plurality of carrier waves, according to a first embodiment.

FIGS. 11 to 13 are diagrams illustrating an example of an operational flowchart for allocating packets to a plurality of carrier waves, according to a first embodiment. Here, FIGS. 11 to 13 illustrate the detail of operation S13 of FIG. 10, and may be performed, for example, by DSP 22 of FIG. 3.

In operation S21, SEL 35*c* determines whether a packet has been stored in buffer 35*ba*. That is, SEL 35*c* determines whether a packet having a Q1 level has been stored in buffer 35*ba*. When it is determined that the packet having a Q1 level has been stored in 35*ba*, the processing shifts to operation S22, and otherwise shifts to operation S28.

In operation S22, SEL 35*c* identifies a first carrier wave (or first CH) that has tolerance parameter "N" largest among a plurality of carrier waves, for example, among carrier waves W1 and W2, by referring to carrier-wave status table 34. In FIGS. 11 to 13, for ease of explanation, "carrier wave" will be also expressed as "CH" which is an abbreviation for "channel".

In operation S23, SEL 35*c* determines whether there exists a free area for transmitting packet data left in a first one of buffers 36*aa* and 36*ab* that corresponds to the first carrier wave (first CH) identified in operation S22. When it is determined that there exists a free area left in the first one of buffers 36*aa* and 36*ab* (YES in operation S23), the processing shifts to operation S24, and otherwise (NO in operation S23) shifts to operation S25.

In operation S24, SEL 35*c* allocates the packet having a Q1 level to the first carrier wave (first CH) having the largest tolerance parameter. In other words, SEL 35*c* allocates the packet having a Q1 level to the first one of buffers 36*aa* and 36*ab* that corresponds to the first carrier wave (first CH) having the largest tolerance parameter.

In operation S25, SEL 35*c* identifies a second carrier wave (a second CH) that has the second-greatest tolerance parameter among the plurality of carrier waves, for example, among carrier waves W1 and W2, by referring to carrier-wave status table 34.

In operation S26, SEL 35*c* determines whether there exists a free area for transmitting packet data left in a second one of buffers 36*aa* and 36*ab* that corresponds to the second carrier wave (the second CH) identified in operation S25. When it is determined that there exists a free area left in the second one of buffers 36*aa* and 36*ab* (YES in operation S26), the processing shifts to operation S27, and otherwise (NO in operation S26) shifts to operation S22.

In operation S27, SEL 35*c* allocates the packet having a Q1 level to the second carrier wave (second CH) having the second-largest tolerance parameter. In other words, SEL 35*c* allocates the packet having a Q1 level to the second one of buffer 36*aa* and 36*ab* that corresponds to the second carrier wave (second CH) having the second-largest tolerance parameter.

In operation S28, SEL 35*c* determines whether there exists a packet stored in buffer 35*bb*. That is, SEL 35*c* determines whether a packet having a Q2 level has been stored in buffer 35*bb*. When it is determined that a packet having a Q2 level has been stored in 35*bb* (YES in operation S28), the processing shifts to operation S29 of FIG. 12, and otherwise (NO in operation S28) shifts to operation S36 of FIG. 13.

In operation S29, SEL 35*c* identifies a first carrier wave (or a first CH) that has the largest tolerance parameter "N" among the plurality of carrier waves, for example, among carrier waves W1 and W2, by referring to carrier-wave status table 34.

In operation S30, SEL 35*c* determines whether there exists a free area for transmitting the packet left in a first one of buffers 36*aa* and 36*ab* that corresponds to the first carrier wave (first CH) identified in operation S29. When it is determined that there exists a free area left in the first one of buffers 36*aa* and 36*ab* (YES in operation S30), the processing shifts to operation S31, and otherwise (NO in operation S30) shifts to operation S33.

In operation S31, SEL 35*c* determines whether there exists an interruption caused by another packet having a higher QoS level than the packet. That is, SEL 35*c* determines whether another packet having a Q1 level has been stored in buffer 35*ba*. When it is determined that there exists the interruption caused by another packet having a higher QoS level than the packet (YES in operation S31), the processing shifts to S33, and otherwise (NO in operation S31) shifts to operation S32.

In operation S32, SEL 35*c* allocates the packet having a Q2 level to the first carrier wave (first CH) having the largest tolerance parameter among the plurality of carrier waves. In other words, SEL 35*c* allocates the packet having a Q2 level to a first one of buffer 36*aa* and 36*ab* that corresponds to the first carrier wave (first CH) having the largest tolerance parameter.

In operation S33, SEL 35*c* identifies a second carrier wave (or a second CH) that has the second-largest tolerance parameter, by referring to carrier-wave status table 34.

In operation S34, SEL 35*c* determines whether there exists a free area for transmitting the packet left in a second one of buffers 36*aa* and 36*ab* that corresponds to the second carrier wave (second CH) identified in operation S33. When it is determined that there exists a free area left in the second one of buffers 36*aa* and 36*ab* (YES in operation S34), the processing shifts to operation S35, and otherwise (NO in operation S34) shifts to operation S29.

In operation S35, SEL 35*c* allocates the packet having a Q2 level to the second carrier wave (second CH) having the second-largest tolerance parameter among the plurality of carrier waves. In other words, SEL 35*c* allocates the packet having a Q2 level to the second one of buffer 36*aa* and 36*ab* that corresponds to the second carrier wave (second CH) having the second-largest tolerance parameter.

In operation S36, SEL 35*c* identifies a first carrier wave (or a first CH) that has the greatest tolerance parameter "N" among the plurality of carrier waves, by referring to carrier-wave status table 34.

In operation S37, SEL 35*c* determines whether there exists a free area for transmitting the packet left in a first one of buffers 36*aa* and 36*ab* that corresponds to the first carrier wave (first CH) identified in operation S36. When it is determined that there exists a free area left in the first one of buffers 36aa and 36ab (YES in operation S37), the processing shifts to operation S38, and otherwise (NO in operation S37) shifts to operation S40.

In operation S38, SEL 35c determines whether there exists an interruption caused by another packet having a higher QoS level than the packet. That is, SEL 35c determines whether another packet having a Q1 or Q2 level has been stored in buffer 35ba. When it is determined that there exists the interruption caused by another packet having a higher QoS level than the packet, the processing shifts to S40 (YES in operation S38), and otherwise (NO in operation S38) shifts to operation S39.

In operation S39, SEL 35c allocates the packet having a Q3 level to the first carrier wave having the largest tolerance parameter among the plurality of carrier waves. In other words, SEL 35c allocates the packet having a Q3 level to the first one of buffer 36aa and 36ab that corresponds to the first carrier wave having the largest tolerance parameter.

In operation S40, SEL 35c identifies a second carrier wave (or a second CH) that has the second-largest tolerance parameter, by referring to carrier-wave status table 34.

In operation S41, SEL 35c determines whether there exists a free area for transmitting the packet left in a second one of buffers 36aa and 36ab that corresponds to the second carrier wave identified in operation S40. When it is determined that there exists a free area left in the second one of buffers 36aa and 36ab (YES in operation S41), the processing shifts to operation S42, and otherwise (NO in operation S41) shifts to operation S36.

In operation S42, SEL 35c allocates the packet having a Q3 level to the second carrier wave having the second-greatest tolerance parameter among the plurality of carrier waves. In other words, SEL 35c allocates the packet having a Q3 level to the second one of buffer 36aa and 36ab that corresponds to the second carrier wave having the second-largest tolerance parameter.

By performing the above-mentioned operations, SEL 35c allocates packets staying in packet allocator 35 to a plurality of carrier waves, based on a service-quality level (a QoS level) assigned to each of the packets and the tolerance parameter calculated for each of the plurality of carrier waves, such that a first packet having the service-quality level equal to or higher than a second packet is allocated, on a priority basis, to a first carrier wave having the tolerance parameter equal to or larger than a second carrier wave to which the second packet is allocated.

In the above-mentioned examples, although descriptions have been given of the case where a packet has three QoS levels, a packet may have more than three QoS levels. For example, in the case of a packet having four or more QoS levels, the embodiment may be implemented by adding operations relating to the increased QoS levels, in a manner similar to operations S21, S28 of FIG. 11 and operations S36 to S42.

In the above-mentioned examples, although descriptions have been given of the case where two carrier waves are used as a plurality of carrier waves, the number of a plurality of carrier waves may be more than two. For example, in the case of three or more carrier waves, the embodiment may be implemented by adding operations relating to the increased carrier waves, in a manner similar to operations S33 to S35 of FIG. 12 and operations S40 to S42 of FIG. 13. For example, the operations may be added in such a manner that, when there exists no free areas left in operations S26 of FIG. 11, SEL 35c identifies a third carrier wave (or a third CH) that has the third-largest tolerance parameter, and allocates the packet to the third carrier wave.

In this way, radio-communication apparatus 11 is configured to receive a current line-quality value of a radio link (a carrier wave) from radio-communication apparatus on the receiving side, and to calculate a tolerance parameter indicating a tolerable margin of the current line-quality value for causing a change of a modulation method to be used for transmitting a radio-signal via the carrier wave. Further, radio-communication apparatus 11 is configured to allocate a packet having high QoS level, on a priority basis, to a carrier wave having a large tolerance parameter. This allows radio-communication apparatus 11 to perform stable radio-transmission on packets having a high QoS level.

Next, description will be given of a second embodiment with reference to figures. According to the second embodiment, tolerance parameters are recorded for a predetermined duration time, and a variation rate of the recorded tolerance parameters is calculated. Then, a packet having a high QoS level is allocated to one of a plurality of carrier waves, based on the current tolerance parameter and the variation rate of the tolerance parameters recorded for the predetermined duration time. A radio-communication apparatus according to the second embodiment may be configured in a manner similar to that depicted in FIG. 3, and the descriptions thereof will be omitted here.

Figure 14:
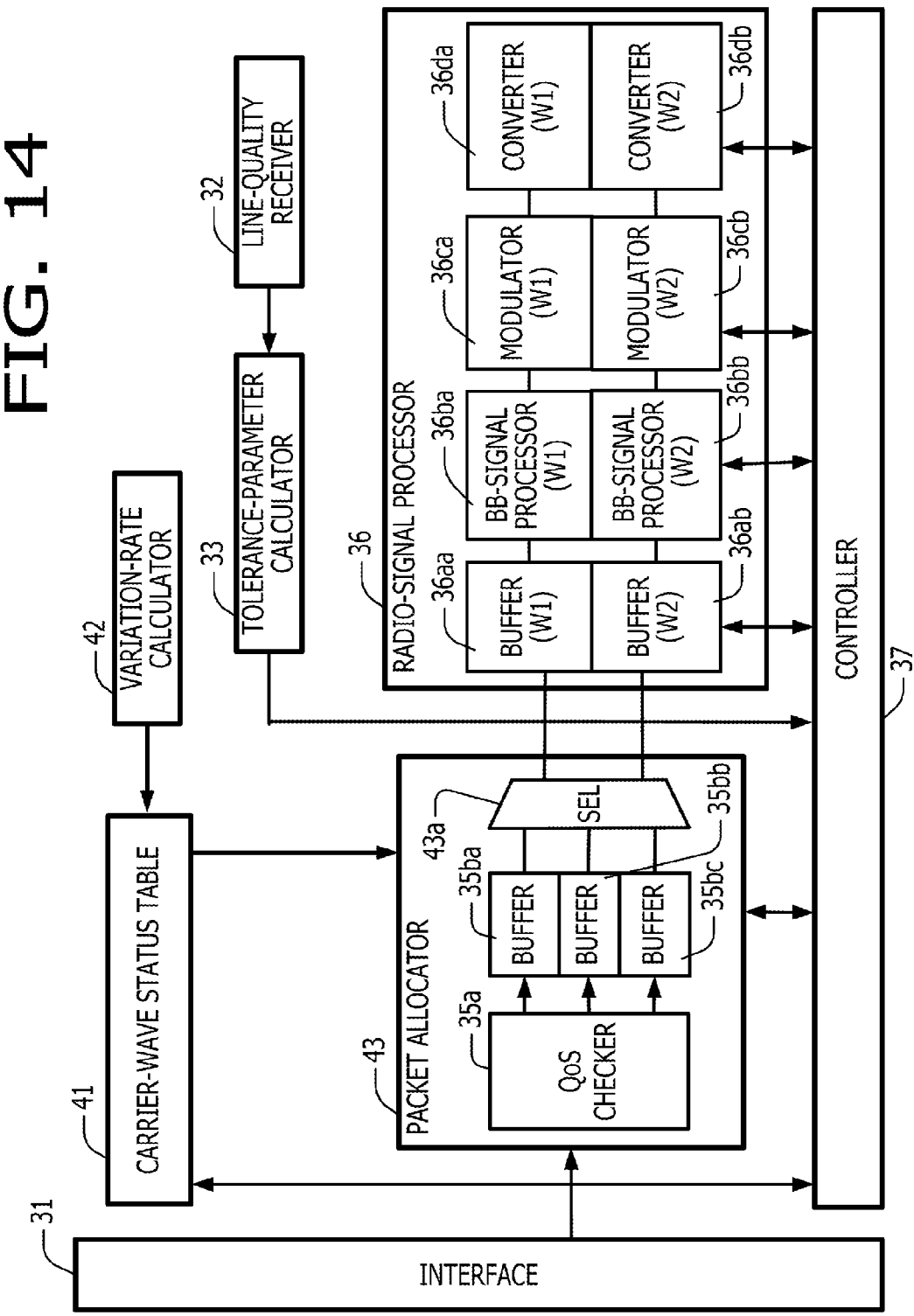
FIG. 14 is a diagram illustrating a configuration example of a radio-communication apparatus, according to a second embodiment.

FIG. 14 is a diagram illustrating a configuration example of a radio-communication apparatus, according to a second embodiment. In FIG. 14, a component having the same function as that of FIG. 4 is provided with the same reference number, and the description thereof will be omitted here. The example of FIG. 14 illustrates, for ease of explanation, the case where the number of a plurality of carrier waves is two.

In radio-communication apparatus 11 of FIG. 14, carrier-wave status table 41 and packet allocator 43 are different from those depicted in radio-communication apparatus 11 of FIG. 4. In packet allocator 43, the function of SEL 43a is different from the corresponding component of FIG. 4. Further, in FIG. 14, radio-communication apparatus 11 includes variation-rate calculator 42 which may be implemented, for example, using FPGA 26 depicted in FIG. 3.

In carrier-wave status table 41, a tolerance parameter for each of a plurality of carrier waves is stored for a predetermined duration time. That is, in carrier-wave status table 41, a predetermined number of tolerance parameters are stored on a first-in, first-out (FIFO) basis. Further, an absolute difference between a current tolerance parameter and a previously-stored tolerance parameter is also stored in carrier-wave status table 41. In addition, a variation rate indicating an average value of the absolute differences is also stored in carrier-wave status table 41.

FIG. 15 is a diagram illustrating an example of a carrier-wave status table, according to a second embodiment. "W1" and "W2" depicted in FIG. 15 indicate carrier waves via which radio-transmission is performed between radio-communication apparatuses 11 and 13. In FIG. 15, column names "N(0)", "N(1)", ... , "N(T)" indicate tolerance parameters that were recorded in carrier-wave status table 41 at time points "0", "1", ... , "T", respectively, where parenthetic figures "0", "1", ... , "T" indicate a sequence of time-point numbers that are sequentially assigned to the time points starting from the latest time-point number "0" to the oldest time-point number "T".

Tolerance parameters of carrier waves W1 and W2 at a time-point "t" (t=1, 2, ... , T) is recorded in a cell at which rows "W1" and "W2" intersect with column "N(t)".

For example, it is seen from carrier-wave status table 41 that tolerance parameters of carrier waves W1 and W2 at the latest time-point "0" are "252" and "53", respectively. Further, it is also seen that tolerance parameters of carrier waves W1 and W2 at the oldest time-point "T" are "222" and "46", respectively.

The absolute differences between tolerance parameters at time-points "t−1" and "t" (t=1, 2, ..., T) for carrier wave W1 or W2, is stored in cells at which rows "ΔN(W1)" and "ΔN(W2)" intersect with column "N(t)", respectively.

For example, absolute difference "18" between the W1 tolerance parameters recorded at time-points "0" and "1" is recorded in a cell of column "N(1)" and row "ΔN(W1)", and absolute difference "11" between the W2 tolerance parameters recorded at time-points "0" and "1" is recorded in a cell of column "N(1)" and row "ΔN(W2)".

Further, the average absolute differences of carrier waves W1 and W2, are stored, as variation rates, in cells at which column "VARIATION RATE" intersects with rows "ΔN(W1)" and "ΔN(W2)", respectively. For example, variation rate "3.2" of tolerance parameters for carrier wave W1 is stored in a cell of column "VARIATION RATE" and row "ΔN(W1)", and variation rate "9.6" of tolerance parameters for carrier wave W2 is stored in a cell of column "VARIATION RATE" and row "ΔN(W2)".

Here, description goes back to FIG. 14. Tolerance parameters that were calculated by tolerance-parameter calculator 33 for a predetermined duration time are recorded in carrier-wave status table 41. For example, as described with reference to FIG. 15, tolerance parameters for each of carrier waves W1, W2, which were calculated at time-points "0", "1", ..., "T", are recorded in carrier-wave status table 41.

Variation-rate calculator 42 calculates, for each of a plurality of carrier waves, a variation rate of tolerance parameters based on the tolerance parameters that were recorded in carrier-wave status table 41 for a predetermined duration time. Variation-rate calculator 42 records the calculated variation rates in carrier-wave status table 41.

Variation-rate calculator 42 may be configured to calculate a variation rate "R" of tolerance parameters for each of the plurality of carrier waves, according to the following formula (2).

$$R = \sum_{n=1}^{T} |N(n) - N(n-1)| \quad (2)$$

In the above formula (2), "N(n)", "N(n−1)" indicate tolerance parameters at time-points "n", "n−1", respectively. In the example of FIG. 15, a variation rate is defined as an average value of all the absolute differences each obtained as an absolute difference between a pair of tolerance parameters at neighboring time-points. In the formula (2), value "R" is calculated as a sum total of all the absolute differences each obtained as an absolute difference between a pair of tolerance parameters at neighboring time-points, without dividing the sum total by the number of recorded tolerance parameters. Meanwhile, a variation rate of FIG. 15 is calculated by dividing a sum total of all the absolute differences by the number of the tolerance parameters. Here, it is assumed that the number of recorded tolerance parameters is fixed. In this case, when comparing a first variation rate of first tolerance parameters with a second variation rate of second tolerance parameters, the comparison result is the same as that of comparing a sum total of all the absolute differences of the first tolerance parameters with a sum total of all the absolute differences of second tolerance parameters. Thus, in the case of comparing magnitudes of variation rates, value "R" calculated by the above formula (1) may be used as a variation rate.

SEL 43a of packet allocator 43 may be configured to allocate a packet having a high QoS level, on a priority basis, to a carrier wave that has a small variation rate and a large tolerance parameter, by referring to carrier-wave status table 41, as will be described with reference to FIG. 16.

FIG. 16 is a schematic diagram illustrating an example of a priority order for allocating packets to a plurality of carrier waves, according to a second embodiment. For example, packet allocation table 44 may be stored in RAM 23 or flash memory 25 of radio-communication apparatus 11. In packet allocation table 44, an allocation number ranging from natural number 1 to natural number 9 is assigned to each pair of degrees of a variation-rate and a tolerance-parameter where each degree of the variation-rate level and the tolerance-parameter level has three values: "small", "medium", and "large".

In packet allocation table 44, the smaller a degree of a variation-rate and the larger a degree of a tolerance-parameter, the smaller an allocation number assigned to a pair of a variation-rate degree and a tolerance-parameter degree is. In other words, the better a line-quality is, the smaller an allocation number assigned to a pair of a variation-rate degree and a tolerance-parameter degree is.

SEL 43a acquires a variation rate and a current tolerance parameter, for each of a plurality of carrier waves, by referring to carrier-wave status table 41. Then, SEL 43a determines to which one of three degrees "small", "medium", and "large" the acquired variation rate belongs, and to which one of three degrees "large", "medium", and "small" the acquired current tolerance parameter belongs.

For example, SEL 43a determines that a variation rate belongs to the "small" degree when the variation rate is smaller than a given threshold value Rth1, determines that a variation rate belongs to the "large" degree when the variation rate is larger than a given threshold value Rth2 (Rth2>Rth1), and determines that a variation rate belongs to the "medium" degree when the variation rate is equal to or greater than a given threshold value Rth1 and equal to or smaller than Rth2. Further, SEL 43a determines that a tolerance parameter belongs to the "large" degree when the tolerance parameter is larger than a given threshold value Nth1, determines that a tolerance parameter belongs to the "small" degree when the tolerance parameter is smaller than a given threshold value Nth2 (Nth2<Nth1), and determines that a tolerance parameter belongs to the "medium" degree when the tolerance parameter is equal to or smaller than the given threshold value Nth1 and equal to or greater than the given threshold value Nth2.

SEL 43a acquires an allocation number corresponding to each of the plurality of carrier waves, by referring to packet allocation table 44 using the determined variation-rate degree and the determined tolerance-parameter degree. Then, SEL 43a allocates a packet having a high QoS level, on a priority basis, to a carrier wave having a small allocation number.

For example, it is assumed that SEL 43a has acquired an allocation number of "1" corresponding to carrier wave W1, and has acquired an allocation number of "3" corresponding to carrier wave W2, by referring to packet allocation table 44. In this case, SEL 43a allocates a packet having a high QoS, on a priority basis, to carrier wave W1.

In the example depicted in FIG. 16, although three degrees were assigned to each of a variation rate and a tolerance parameter, it is also possible to assign two or four degrees to each of a variation rate and a tolerance parameter. Further, in the example of FIG. 16, although an allocation number is assigned to each pair of a variation-rate dimension and a tolerance-parameter dimension such that sequential allocation numbers are assigned to tolerance-parameter degrees intersecting with the same variation-rate degree, it is also possible to assign sequential allocation numbers to variation-rate degrees intersecting with the same tolerance parameter. In this case, for example, in FIG. 16, allocation number "2" is stored in a cell of tolerance-parameter degree "large" and variation-rate degree "medium", allocation number "3" is stored in a cell of tolerance-parameter degree "large" and variation-rate dimension "large", and allocation number "4" is stored in a cell of tolerance-parameter degree "medium" and variation-rate dimension "small". In the similar manner, the other allocation numbers may be stored in each of cells of packet allocation table 44. In other words, allocation numbers are sequentially, in ascending order, assigned to each pair of a variation-rate degree and a tolerance-parameter degree so that small allocation numbers are assigned, on a priority basis, to tolerance parameters.

Figure 17:
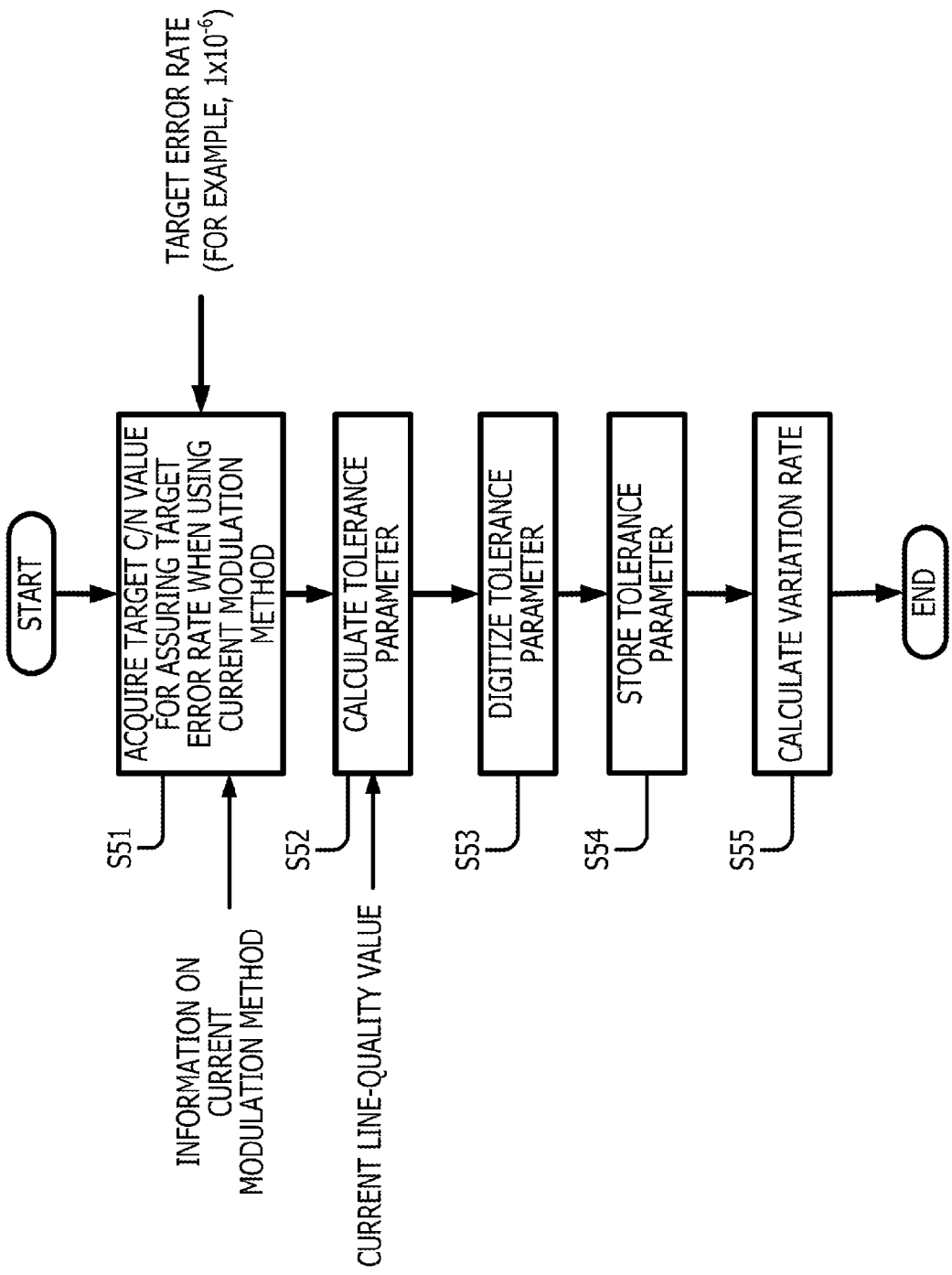
FIG. 17 is a diagram illustrating an example of an operational flowchart for calculating a tolerance parameter and a variation rate, according to a second embodiment.

FIG. 17 is a diagram illustrating an example of an operational flowchart for calculating a tolerance parameter and a variation rate, according to a second embodiment. Operations S51 to S53 of FIG. 17 may be performed in a manner similar to operations S1 to S3 of FIG. 9, and the descriptions thereof will be omitted here. Here, the following operations S51 to S55 may be performed, for example, using FPGA 26 of FIG. 3.

In operation S54, tolerance-parameter calculator 33 stores a predetermined duration time of the digitized tolerance parameters in carrier-wave status table 41. For example, tolerance-parameter calculator 33 stores the digitized tolerance parameters of N(0) to N(T) in carrier-wave status table 41, in association with each of carrier waves W1, W2.

In operation S55, variation-rate calculator 42 calculates a variation rate of tolerance parameters based on the predetermined duration time of tolerance parameters stored in carrier-wave status table 41. Then, variation-rate calculator 42 stores the calculated variation rate in carrier-wave status table 41.

By performing the above-mentioned operations, tolerance parameters and a variation rate of the tolerance parameters are calculated, and stored in carrier-wave status table 41.

Operations for performing radio-signal processing on a received packet according to the second embodiment may be performed in a manner similar to those of FIG. 10 except for operation S13.

For example, in operation S13, SEL 43a acquires a current tolerance parameter and a variation rate for each of carrier waves by referring to carrier-wave status table 41. Then, SEL 43a acquires an allocation number corresponding to each of carrier waves by referring to packet allocation table 44 that is stored in RAM 23 or flash memory 25. SEL 43a outputs packets stored in buffers 35ba, 35bb, 35bc to radio-signal processor 36 so that a packet having high QoS level is allocated, on a priority basis, to a carrier wave corresponding to a small allocation number.

Operations for allocating packets to a plurality of carrier waves according to the third embodiment may be performed in a manner similar to those described with reference to the operational flowcharts of FIGS. 11 to 13 by changing expression "largest tolerance parameter", "second-largest tolerance parameter" to "smallest allocation number", "second-smallest allocation number", respectively. That is, the expression "identify first CH having largest tolerance parameter" in operations S22, S29, S36 is changed to the expression "identify first CH having smallest allocation number", and "identify second CH having second-largest N" in operations S25, S33, S40 is changed to the expression "identify second CH having second-smallest allocation number".

In this way, radio-communication apparatus 11 according to a second embodiment is configured to calculate a variation rate of tolerance parameters, and to allocate a packet having a high QoS level, on a priority basis, to a carrier wave that has a large tolerance parameter and a small variant rate. This allows radio-communication apparatus 11 to perform a stable radio-transmission on a packet having high QoS level.

Next, description will be given of a third embodiment with reference to diagrams. According to the third embodiment, radio-communication apparatus on the transmitting side receives a current C/N value and a current receiving level of radio signal from radio-communication apparatus on the receiving side. Radio-communication apparatus on the transmitting side not only calculates a first tolerance parameter based on the received current C/N value as described in the first embodiment, but also calculates a second tolerance parameter based on the received current receiving level, and combines the first and second tolerance parameters to generate a combined tolerance parameter. Then, radio-communication apparatus on the transmitting side allocates a packet having a high QoS level, on a priority basis, to one of carrier waves that is selected based on the combined tolerance parameter. A hardware configuration of radio-communication apparatus according to the third embodiment may be implemented in a manner similar to the example of the hardware configuration depicted in FIG. 3, and descriptions thereof will be omitted here.

Figure 18:
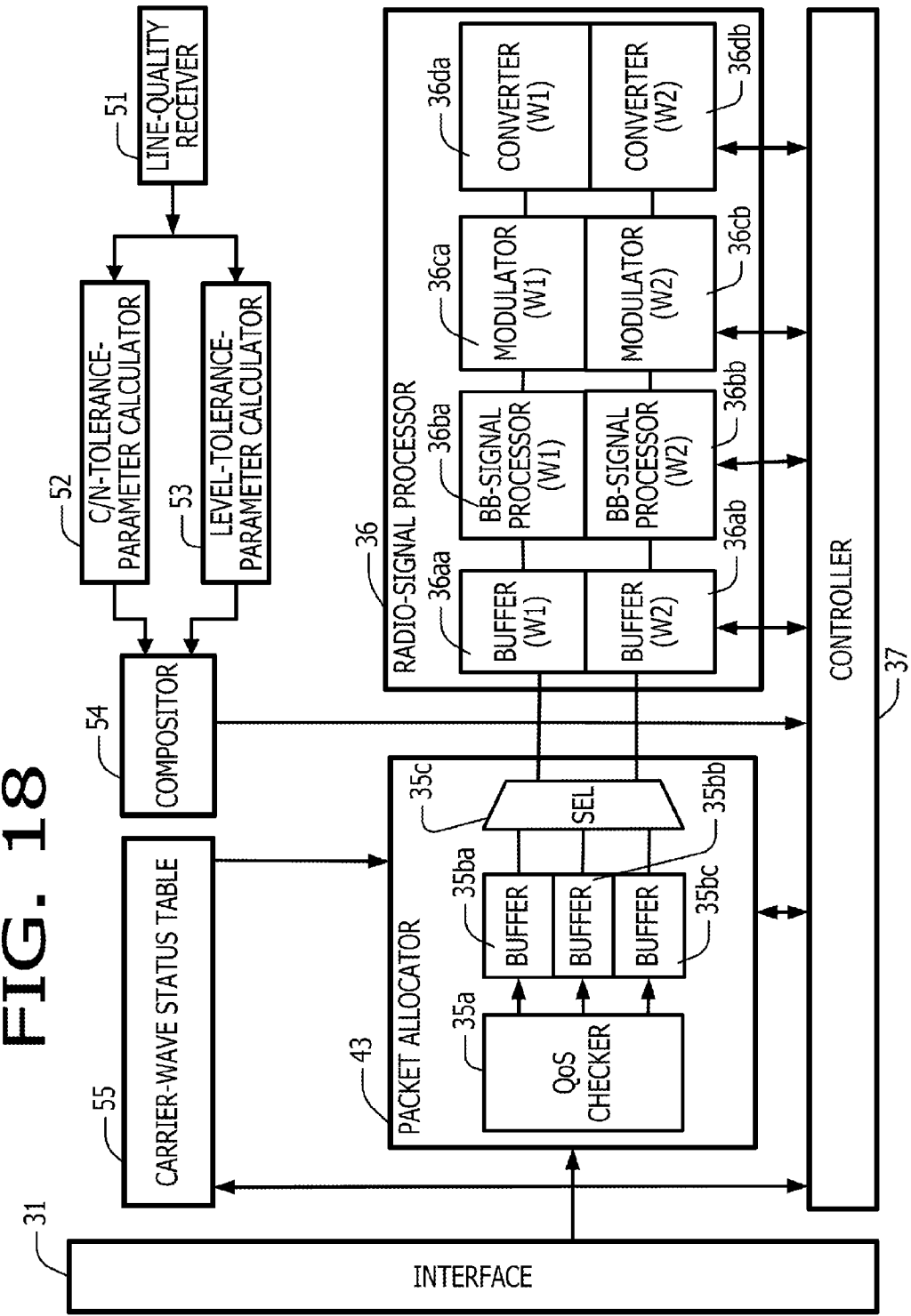
FIG. 18 is a diagram illustrating a configuration example of a radio-communication apparatus, according to a third embodiment.

FIG. 18 is a diagram illustrating a configuration example of a radio-communication apparatus, according to a third embodiment. In FIG. 18, a component having the same function as that of FIG. 4 is provided with the same reference number, and the description thereof will be omitted here.

In radio communication apparatus 11 of FIG. 18, line-quality receiver 51, C/N-tolerance-parameter calculator 52, level-tolerance-parameter calculator 53, compositor 54, and carrier-wave status table 55 are different from those depicted in radio-communication apparatus 11 of FIG. 4.

Line-quality receiver 51 receives line-quality information for each of a plurality of carrier waves from radio-communication apparatus 13 on the receiving side. The line-quality information includes a current receiving level, in addition to a current C/N value described in the first embodiment. The current receiving level indicates a received power of a radio signal that is received by radio-communication apparatus 13 on the receiving side. For example, line-quality receiver 51 may be implemented as radio-signal processor 24 depicted in FIG. 3.

C/N-tolerance-parameter calculator 52 calculates a C/N-tolerance parameter based on a current C/N value included in the line-quality information received by line-quality receiver 51. C/N-tolerance-parameter calculator 52 may be operated in a manner similar to tolerance-parameter calculator 33 depicted in FIG. 4, and descriptions thereof will be omitted here.

Level-tolerance-parameter calculator 53 calculates a level-tolerance parameter based on current receiving level included in the line-quality information received by line-quality receiver 51. For example, level-tolerance-parameter calculator 53 may be implemented using FPGA 26 as depicted in FIG. 3.

Here, descriptions will be given of a level-tolerance parameter. Firstly, descriptions of changing a modulation method will be given. Although a modulation method may be changed for each of a plurality of carrier waves, for ease of explanation, the descriptions will be given without distinction between carrier waves.

FIG. 19 is a diagram illustrating an example of a level-error tolerance table. The level-error tolerance table stores a receiving level (RL), as a line-quality value for assuring a target error rate when using each of modulation methods. As depicted in FIG. 19, the level-error tolerance table includes a column of BER and a column of a Receiving Level (RL) for each of modulation methods. Column "BER" stores an error rate, and column "RL" of each of the modulation methods stores the smallest receiving level for assuring the "BER" value associated therewith.

For example, in the case of a modulation method of 64QAM, it is seen from the level-error tolerance table of FIG. 19 that a current receiving level equal to or larger than "−69.0 dBm" is needed for ensuring an error rate equal to or smaller than "$10^{-6}$". Further, in the case of a modulation method of 16QAM, it is seen from the level-error tolerance table of FIG. 19 that a current receiving level equal to or larger than "−75.3 dBm" is needed for ensuring an error rate equal to or smaller than "$10^{-6}$".

Radio-communication apparatus 11 may be configured, for example, to store a level-error tolerance table depicted in FIG. 19 in RAM 23 or flash memory 25. Radio-communication apparatus 11 changes a modulation method by referring to the level-error tolerance table, together with the error tolerance table depicted in FIG. 6.

The description goes back to FIG. 18. Level-tolerance-parameter calculator 53 calculates a level-tolerance parameter according to the following formula (3).

$$\text{(level-tolerance parameter)} = \text{(current receiving level)} - \text{(target receiving level)} \quad (3)$$

Here, "current receiving level" of formula (3) indicates the receiving level that was measured by radio-communication apparatus 13, and may be acquired from line-quality information that has been transmitted from radio-communication apparatus 13 on the receiving side.

Further, "target receiving level" indicates a receiving level corresponding to a target error rate that is being set for radio-transmission between radio-communication apparatuses 11 and 13, and may be acquired, by referring to the level-error tolerance table using a modulation method that is currently being used for radio-transmission.

A level-tolerance parameter indicates a tolerable margin of a current receiving level for causing a change of a modulation method. That is, the level-tolerance parameter indicates the size of a tolerable range of a current receiving level at which a change of a modulation method is not needed.

Compositor 54 combines a C/N-tolerance parameter calculated by C/N-tolerance-parameter calculator 52 and a level-tolerance parameter calculated by level-tolerance-parameter calculator 53. Here, compositor 54 determines a degree of a first effect that is caused by frequency-selectivity fading and imposed on the line quality, and a degree of a second effect that is caused by flat fading and imposed on the line quality. Then, compositor 54 combines the C/N-tolerance parameter and the level-tolerance parameter to generate a combined tolerance parameter, by assigning a first weight corresponding to the first effect and a second weight corresponding to the second effect, to the C/N-tolerance parameter and the level-tolerance parameter, respectively. Compositor 54 stores, for each of the plurality of carrier waves, the combined tolerance parameter in radio-carrier status table 55. Compositor 54 may be, for example, implemented using FPGA 26 as depicted in FIG. 3.

Here, frequency-selectivity fading means that a current receiving level fluctuates within a certain frequency range of radio carrier waves. Flat fading means that a current receiving level fluctuates in the whole range of radio carrier waves. In general, degradation of a current C/N value is caused predominantly by frequency-selectivity fading, and degradation of a current receiving level is caused predominantly by flat fading. Therefore, for example, when compositor 54 has determined that the degradation of a line quality between radio communication apparatuses 11 and 13 is mainly caused by flat fading rather than by frequency-selectivity fading, compositor 54 combines the C/N-tolerance parameter and the level-tolerance parameter so that a large weight value is assigned to the C/N tolerance parameter.

Figure 20:
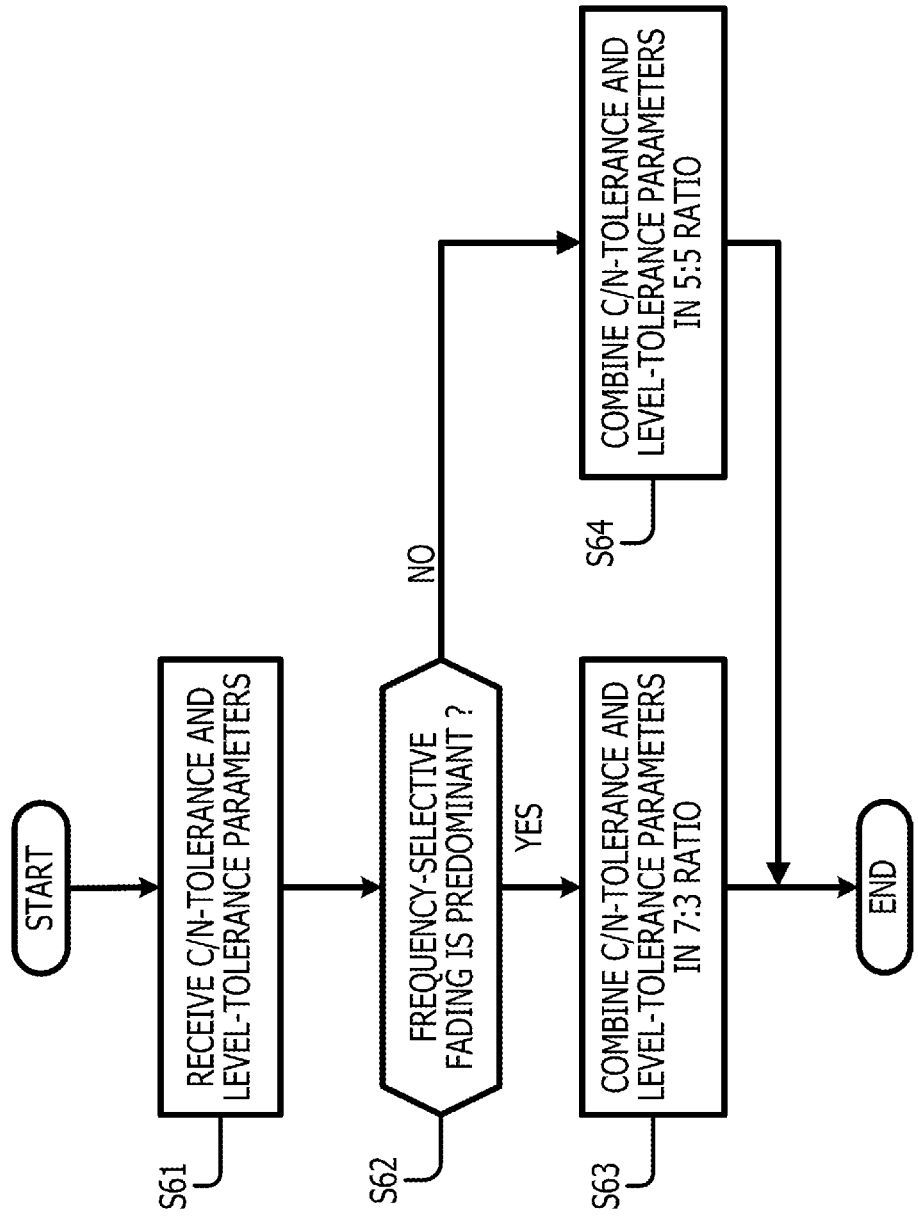
FIG. 20 is a diagram illustrating an example of an operational flowchart for combining a C/V-tolerance parameter and a level-tolerance parameter, according to a third embodiment.

FIG. 20 is a diagram illustrating an example of an operational flowchart for combining a C/V-tolerance parameter and a level-tolerance parameter, according to a second embodiment. Here, the following operations S61 to 64 may be performed, for example, using FPGA 26 of FIG. 3.

In operation S61, compositor 54 receives a C/N-tolerance parameter and a level-tolerance parameter, from C/N-tolerance-parameter calculator 52 and level-tolerance-parameter calculator 53, respectively.

In operation S62, compositor 54 determines whether a frequency-selective fading is predominant or not, that is, whether a frequency-selective fading has a greater effect on the line quality between radio-communication apparatuses 11 and 13 than a flat fading. When it is determined that the frequency-selective fading is predominant (YES in operation S62), the processing shifts to operation S63. Whereas, when it is determined that the frequency-selective fading is not predominant (NO in operation S62), the processing shifts to operation S64.

The determination whether a frequency-selective fading is predominant or not may be performed, for example, by radio-communication apparatus 13 on the receiving side such that radio-communication apparatus 13 monitors a spectrum of a carrier wave using a spectrum analyzer implemented on radio-communication apparatus 13. Then, radio-communication apparatus 13 on the receiving side transmits the line-quality information including the determined result to radio-communication apparatus 11 on the transmitting side. As another method different from the above mentioned method, compositor 54 may calculate a variation rate of C/N-tolerance parameters as described in the second embodiment. Then, compositor 54 determines that a frequency-selective fading has a larger effect on the line quality when the calculated variation rate is larger than a predetermined value.

In operation S63, compositor 54 combines the C/N-tolerance parameter and the level-tolerance parameter, for example, in a weighting ratio of 7:3, to generate a combined tolerance parameter.

In operation S64, compositor 54 combines the C/N-tolerance parameter and the level-tolerance parameter, for example, in a weighting ratio of 5:5, to generate a combined tolerance parameter.

In the case, radio propagation characteristics may change depending on a location or a climate in which radio-communication apparatuses 11, 13 are installed, such as a sea area, a mountain region, or a plain field. Therefore, the weighting ratios depicted in FIG. 20, such as "7:3" or "5:5", may be changed depending on installation conditions of radio-communication apparatuses 11, 13. Here, changing the weighting ratios may be performed by controller 37.

Here, the descriptions return to FIG. 18. Carrier-wave status table 55 is configured to store combined tolerance parameters combined by compositor 54. Radio-carrier status table 55 may be, for example, implemented using RAM 23 as depicted in FIG. 3.

Figure 21:
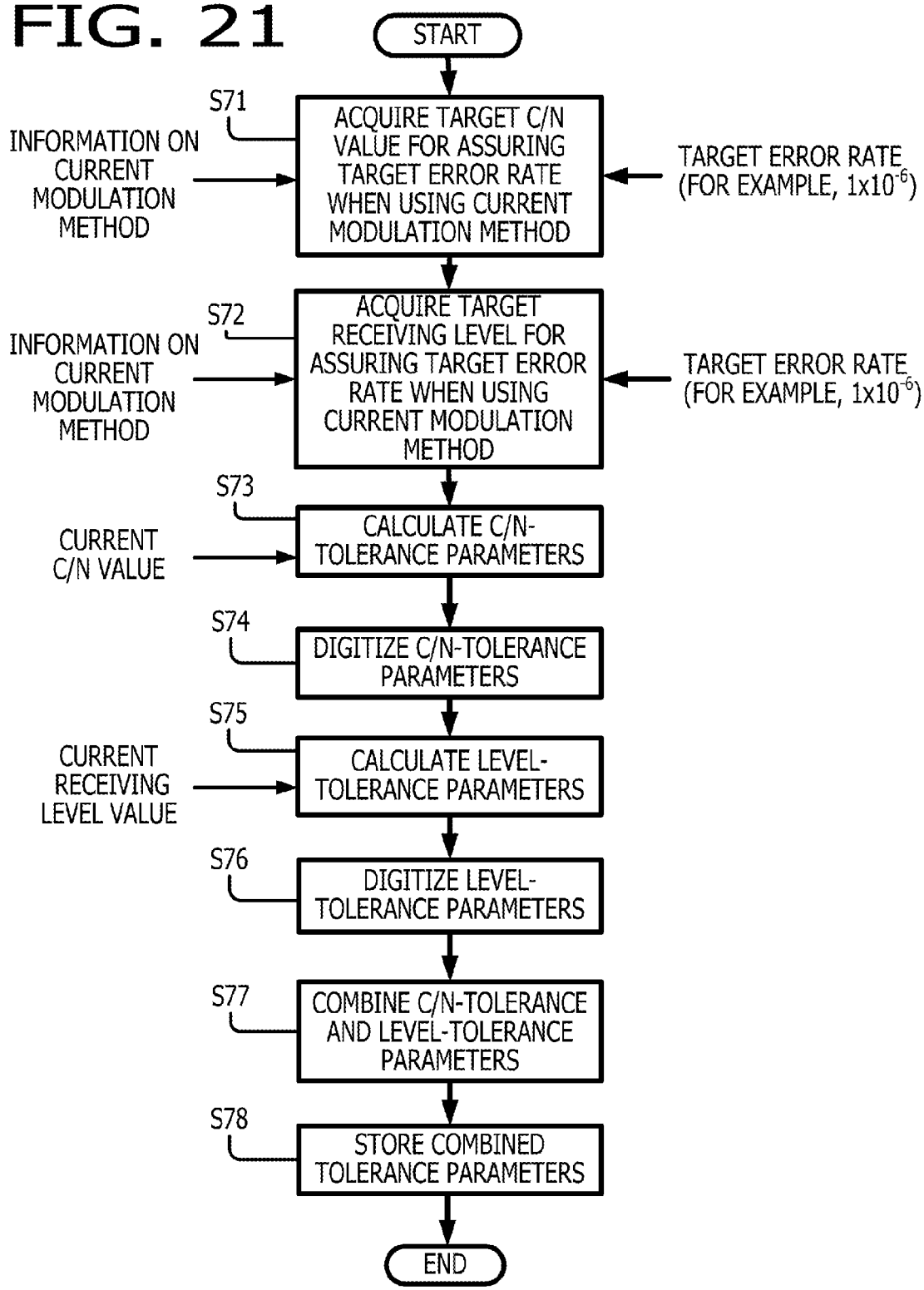
FIG. 21 is a diagram illustrating an example of an operational flowchart for calculating a combined tolerance parameter, according to a third embodiment.

FIG. 21 is a diagram illustrating an example of an operational flowchart for calculating a combined tolerance parameter, according to a second embodiment. Here, the following operations S71 to S78 may be performed, for example, using FPGA 26 of FIG. 3.

In operation S71, C/N-tolerance-parameter calculator 52 acquires information on a modulation method that is currently used for each of a plurality of carrier waves, from controller 37. Further, C/N-tolerance-parameter calculator 52 acquires a target error rate that is to be assured for radio-transmission from controller 37.

Then, C/N-tolerance-parameter calculator 52 acquires a current C/N value that is necessary for assuring the target error rate when using the currently-used modulation method. That is, C/N-tolerance parameter calculator 52 acquires the "target C/N value" described in the formula (1), by referring to the error-tolerance table depicted in FIG. 6, using the target error rate and the information on the currently-used modulation method which were acquired from controller 37.

In operation S72, level-tolerance-parameter calculator 53 acquires information on the modulation method that is currently used for each of carrier waves W1, W2, from controller 37. Further, level-tolerance-parameter calculator 53 acquires the target error rate from controller 37.

Then, level-tolerance-parameter calculator 53 acquires a current receiving level that is necessary for assuring the target error rate using the currently-used modulation method. That is, level-tolerance-parameter calculator 53 acquires the "target receiving level" described in the formula (3), by referring to the level-tolerance table depicted in FIG. 19, using the target error rate and the information on the currently-used modulation method which were acquired from controller 37.

In operation S73, C/N-tolerance-parameter calculator 52 calculates a C/N-tolerance parameter, based on the current C/N value included in the line-quality information received by line-quality receiver 51 and the "target C/N value" acquired in operation S71. Here, C/N-tolerance-parameter calculator 52 calculates the C/N-tolerance parameter according to the above mentioned formula (1).

In operation S74, C/N-tolerance-parameter calculator 52 digitizes the calculated C/N-tolerance parameter. For example, C/N-tolerance-parameter calculator 52 digitizes the calculated C/N-tolerance parameter into an integer value ranging from 0 to 255.

In operation S75, level-tolerance-parameter calculator 53 calculates level-tolerance parameter based on the current receiving level included in the line-quality information received by line-quality receiver 51 and the "target receiving level" acquired in operation S72. Here, level-tolerance-parameter calculator 53 calculates level-tolerance parameter according to the above mentioned formula (3).

In operation S76, level-tolerance-parameter calculator 53 digitizes the calculated level-tolerance parameter, for example, into an integer number ranging from 0 to 255.

In operation S77, compositor 54 combines the C/N-tolerance parameter calculated in operation S74 and the level-tolerance parameter calculated in operation S76 to generate a combined tolerance parameter. Here, compositor 54 combines the C/N-tolerance parameter and the level-tolerance parameter by assigning a weight value to each of the C/N-tolerance parameter and the level-tolerance parameter as described in the operational flowchart of FIG. 20.

In operation S78, compositor 54 stores the combined tolerance parameter that was generated by combining the C/N-tolerance parameter and the level-tolerance parameter, in carrier-wave status table 55. Here, compositor 54 stores, in carrier-wave status table 55, the combined tolerance parameter in association with each of the plurality of carrier waves, in a manner similar to carrier-wave status table 34 depicted in FIG. 4.

By performing the above-mentioned operations, a combined tolerance parameter is calculated, and stored in carrier-wave status table 55.

Operations for performing radio-signal processing on a received packet according to the third embodiment, may be performed in a manner similar to the operational flowchart of FIG. 10, and descriptions thereof will be omitted here. Further, operations for allocating packets to carrier waves may be performed in a manner similar to the operational flowchart of FIGS. 11 to 13, and descriptions thereof will be omitted here.

In this way, radio-communication apparatus 11 according to a third embodiment may be configured so that radio-communication apparatus 11 combines a C/N tolerance parameter and a level-tolerance parameter to generate a combined tolerance parameter, and allocates a packet having a high QoS level to a carrier wave having a large combined tolerance parameter. This allows radio-communication apparatus 11 to perform an appropriate and stable radio-transmission on a packet having a high QoS level, depending on fading conditions.

Next, description will be given of a fourth embodiment with reference to diagrams. According to the fourth embodiment, a radio-communication apparatus may be configured by combining the second, third, and fourth embodiments. In radio-communication apparatus according to the fourth embodiment, a hardware configuration thereof may be configured in a manner similar to the configuration example depicted in FIG. 3, and descriptions thereof will be omitted here.

Figure 22:
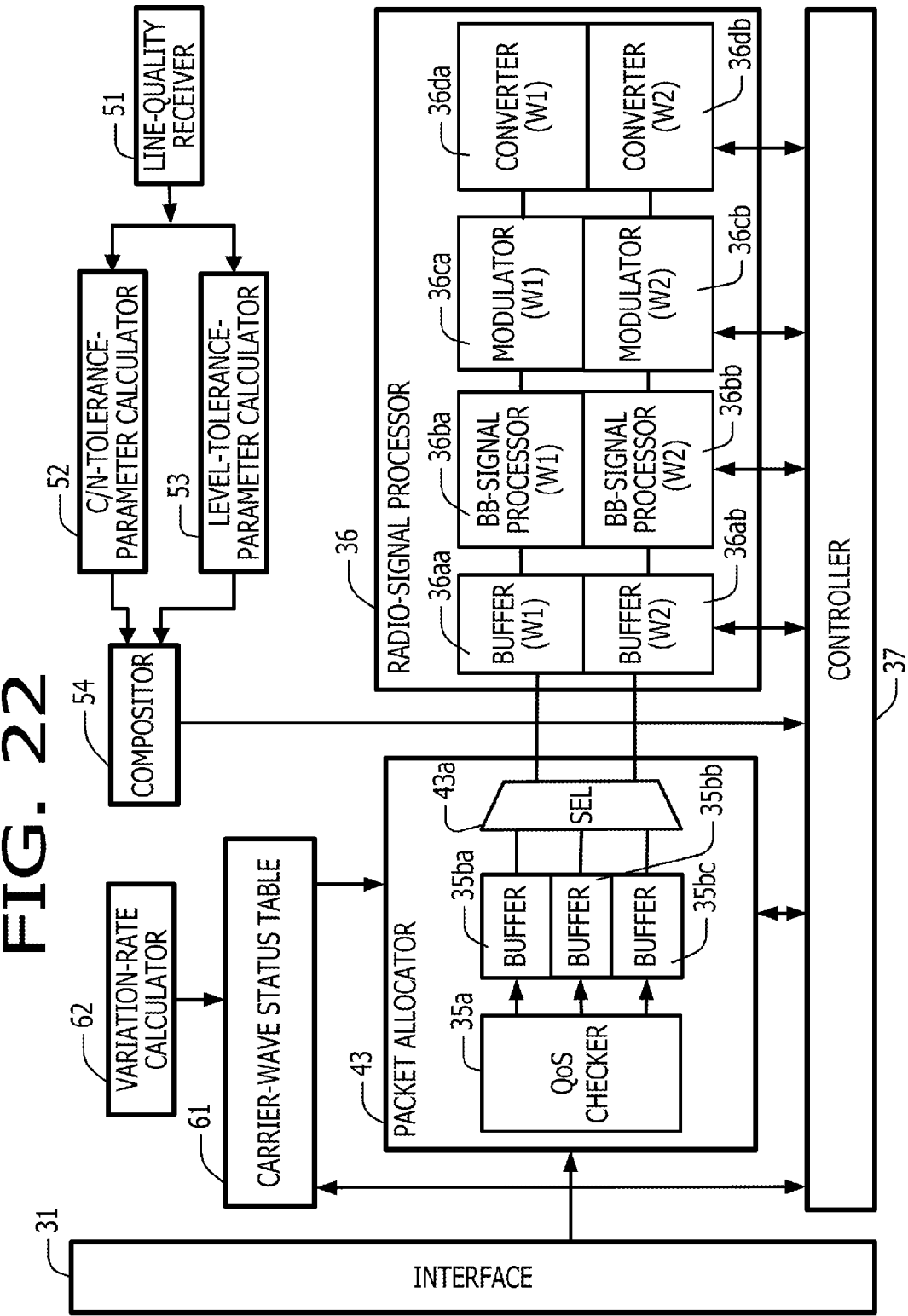
FIG. 22 is a diagram illustrating a configuration example of a radio-communication apparatus, according to a fourth embodiment.

FIG. 22 is a diagram illustrating a configuration example of a radio-communication apparatus, according to a fourth embodiment. In FIG. 22, a component having the same function as that of FIG. 14 or 18 is provided with the same reference number, and the description thereof will be omitted here.

In radio-communication apparatus 11 of FIG. 22, carrier-wave status table 61 and variation-rate calculator 62 are different from those depicted in radio-communication apparatus 11 of FIG. 18.

In carrier-wave status table 61, a predetermined duration time of combined tolerance parameters (each being generated, by compositor 54, by combining a C/N-tolerance parameter and a level-tolerance parameter) are stored in association with each of a plurality of carrier waves. That is, a predetermined number of combined tolerance parameters are stored in carrier-wave status table 61 using a first-in first-out (FIFO) method. Further, absolute differences each indicating an absolute difference between a pair of combined tolerance parameters recorded at neighboring time-points are stored in carrier-wave status table 61. Further, a variation rate indicating an average value of the absolute differences is also stored in carrier-wave status table 61.

FIG. 23 is a diagram illustrating an example of a radio-carrier status table, according to a fourth embodiment. "W1" and "W2" depicted in FIG. 23 indicate carrier waves via which radio-transmission is performed between radio communication apparatuses 11 and 13. In FIG. 23, column names "N(0)", "N(1)", . . . , "N(T)" indicate combined tolerance parameters that were recorded in carrier-wave status table 61 at time points "0", "1", . . . , "T", respectively, where parenthetic figures "0", "1", . . . , "T" indicate a sequence of time-point numbers that are sequentially assigned to the time points starting from the latest time-point number "0" to the oldest time-point number "T". Carrier-wave status table 61 may be configured in a manner similar to carrier-wave status table 41 of FIG. 15, and descriptions thereof will be omitted here.

Here, the descriptions return to FIG. 22. Variation-rate calculator 62 calculates a variation rate of combined tolerance parameters based on a predetermined duration time of combined tolerance parameters stored in carrier-wave status table 61, and stores the calculated variation rate in carrier-wave status table 61. Here, variation calculator 62 calculates the variation rate according to the formula (2) mentioned above.

SEL 43a of packet allocator 43 may be configured to allocate a packet having a high QoS level to a carrier wave that has a small variation rate and a large combined tolerance parameter, by reference to carrier-wave status table 61, in a manner similar to the description of FIG. 14. That is, SEL 43a of FIG. 22 may be configured to allocate a packet having a high QoS level to a carrier wave, based on combined tolerance parameters that are generated by combining a C/N tolerance parameter and a level-tolerance parameter, and the variation rate of the combined tolerance parameters.

Figure 24:
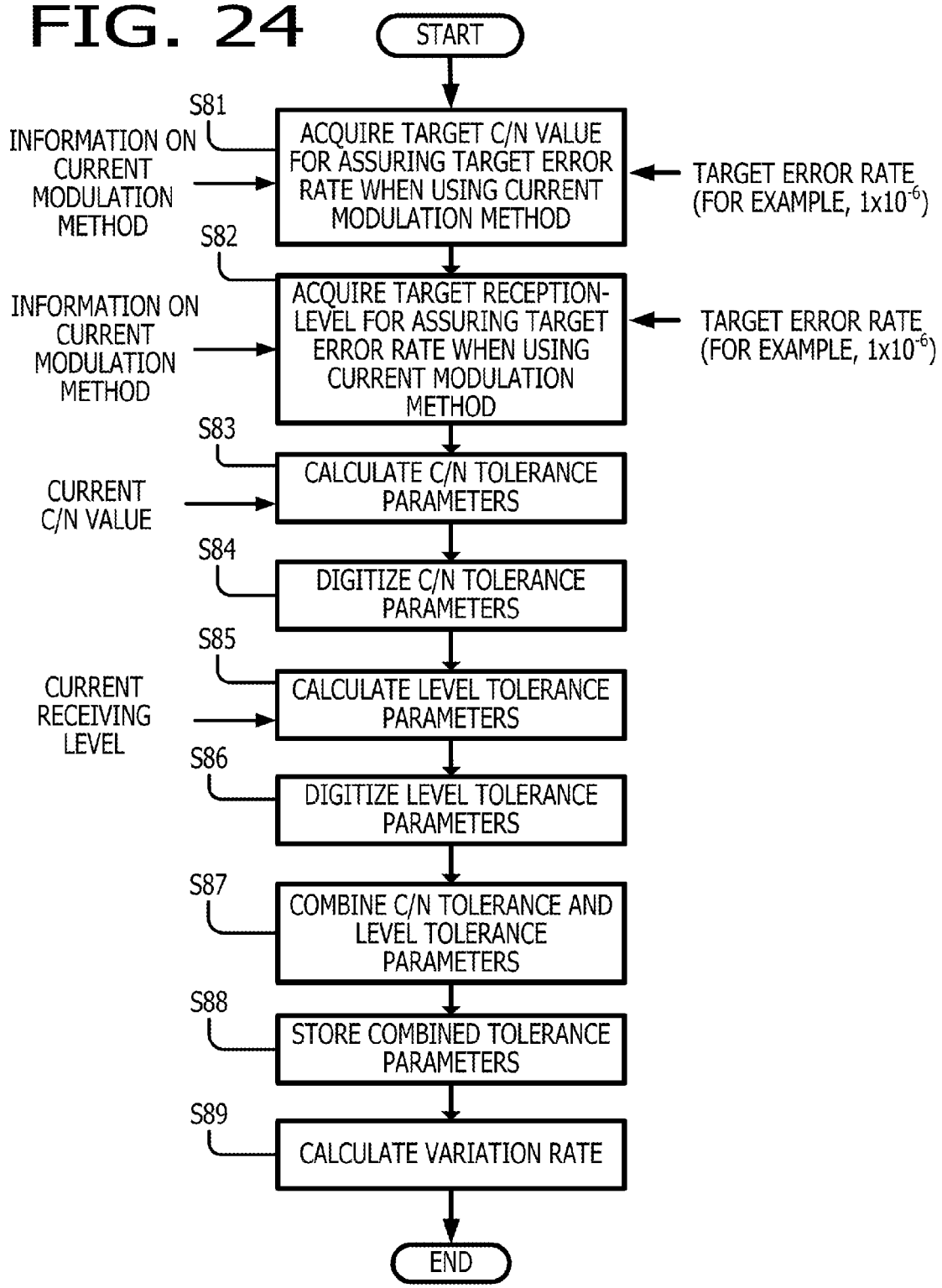
FIG. 24 is a diagram illustrating an example of an operational flowchart for calculating a combined tolerance parameter and a variation rate, according to a fourth embodiment.

FIG. 24 is a diagram illustrating an example of an operational flowchart for calculating a combined tolerance parameter and a variation rate, according to a fourth embodiment. Operations S81 to S87 of FIG. 24 may be performed in a manner similar to operations S71 to S77 depicted in FIG. 21, and descriptions thereof will be omitted here. Here, the following operations S81 to 89 may be performed, for example, using FPGA 26 of FIG. 3.

In operation S88, compositor 54 stores a predetermined duration time of combined tolerance parameters that have been generated by combining a C/N-tolerance parameter and a level-tolerance parameter, in carrier-wave status table 61. For example, compositor 54 stores the generated combined tolerance parameters that were stored at time points "0" to "T" in carrier-wave status table 61, in association with each of carrier waves W1, W2.

In operation S89, variation-rate calculator 62 calculates, based on a predetermined duration time of combined tolerance-parameters stored in carrier-wave status table 61, and stores the calculated variation rate in carrier-wave status table 61.

By performing the above-mentioned operations, combined tolerance-parameters and variation rates are calculated, and stored in carrier-wave status table 61.

In this way, radio-communication apparatus 11 according to a fourth embodiment may be configured so that radio-communication apparatus 11 calculates a C/N-tolerance parameter and a level-tolerance parameter, generates a combined tolerance parameter by combining the C/N-tolerance parameter and the level-tolerance parameter, and stores a predetermined duration time of combined tolerance-parameters. Then, radio-communication apparatus 11 calculates a variation rate of the combined tolerance-parameters, and allocates a packet having a high QoS level to a carrier wave, based on the calculated variation rate and a current combined tolerance parameter. This allows radio-communication apparatus 11 to perform a stable radio-transmission on a packet having a high QoS level.

Next, description will be given of a fifth embodiment with reference to diagrams. According to the fifth embodiment, a radio-communication apparatus is configured to perform N+1 redundancy control. In radio-communication apparatus according to the fifth embodiment, a hardware configuration thereof may be implemented in a manner similar to the configuration example depicted in FIG. 3, and descriptions thereof will be omitted here.

Figure 25:
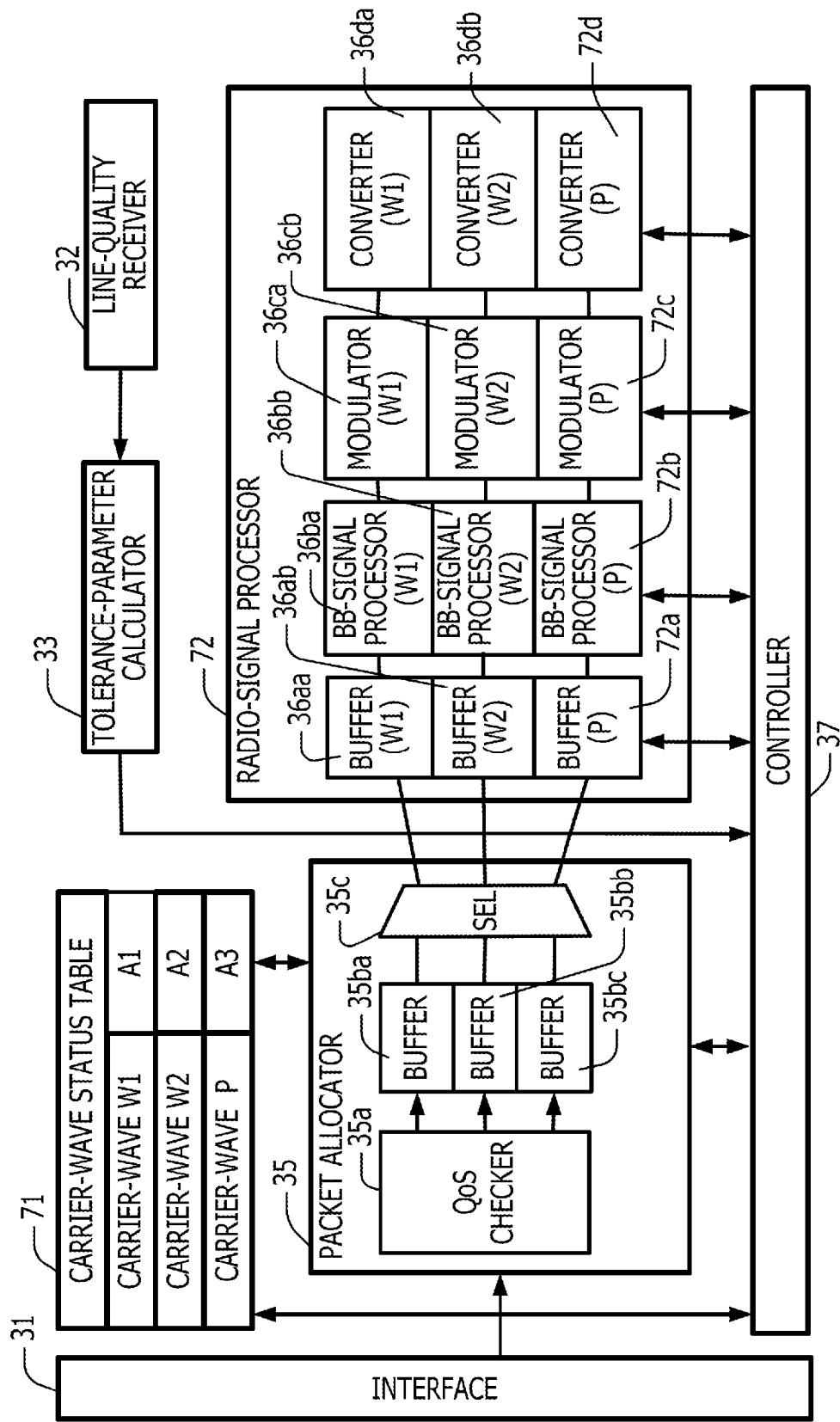
FIG. 25 is a diagram illustrating a configuration example of a radio-communication apparatus, according to a fifth embodiment.

FIG. 25 is a diagram illustrating a configuration example of a radio-communication apparatus, according to a fifth embodiment. In FIG. 25, a component having the same function as that of FIG. 4 is provided with the same reference number, and the description thereof will be omitted here.

In radio-communication apparatus 11 of FIG. 25, carrier-wave status table 71 and signal processor 72 are different from those depicted in radio-communication apparatus 11 of FIG. 4. Signal processor 72 is different from signal processor 36 of FIG. 4, in including components: buffer 72a, BB-signal processor 72b, modulator 72c, and converter 72d, which serve as a backup.

Radio-communication apparatus 11 of FIG. 25 is configured to perform radio-transmission using backup carrier wave P on behalf of carrier wave W1 or W2 when a fault has occurred in one of carrier waves W1 and W2. In FIG. 25, symbol "(P)" appended to the name of a component means that the component serve as a backup component for dealing with backup carrier wave P.

In radio-communication apparatus 11 of FIG. 25, radio-transmission between radio-communication apparatuses 11 and 13 is performed using backup carrier wave P when a fault has occurred in one of carrier waves W1 and W2 that is working. For example, when a fault has occurred in carrier wave W2, radio-communication apparatus 11 performs radio-transmission between radio-communication apparatuses 11 and 13 using carrier wave W1 and backup carrier wave P.

Radio-transmission using carrier waves W1, W2, may be performed in the similar manner as described with reference to FIG. 4. Further, for example, in the case where, when a fault has occurred in carrier wave W2, radio-transmission is performed using working carrier wave W1 and backup carrier wave P in the similar manner as described with reference to FIG. 4.

For example, when a fault has occurred in carrier wave W2, line-quality receiver 32 receives line-quality information for each of carrier waves W1 and P from radio-communication apparatus 13 on the receiving side. Tolerance-parameter calculator 33 calculates a tolerance parameter for each of carrier wave W1 and backup carrier wave P, based on the received line-quality information, and stores the calculated-tolerance parameter in association with each of carrier waves W1, P, for example, as depicted in carrier-wave status table 71 of FIG. 25.

SEL 35c, in the case of the above-mentioned example, allocates packets stored in buffers 35ba, 35bb, 35bc to buffers 36aa, 72a so that a packet having a high QoS level is allocated, on a priority basis, to one of carrier waves W1, P that has large tolerance parameter.

That is, when a fault has occurred, tolerance-parameter calculator 33 calculates a tolerance parameter for each of a backup carrier wave and a carrier wave in which there exist no faults occurring. SEL 35c allocates a packet having a high service quality, on a priority basis, to one of a backup carrier wave and a working carrier wave that has a large tolerable margin of a current line-quality value for causing a change of a modulation method.

FIG. 26 is a schematic diagram illustrating an example of an operation sequence for allocating packets to a plurality of carrier waves, according to an fifth embodiment. In FIG. 26, each of boxes indicates a packet, and each of symbols Q1, Q2, Q3 depicted in boxes represents a QoS level of a packet indicated by the corresponding box. Q1, Q2, and Q3 indicate high, middle, and low QoS levels, respectively. Symbols W1, W2 of FIG. 26 indicate, respectively, working carrier waves W1, W2 to which packets are to be allocated.

In FIG. 26, chart 910 illustrates a packet allocation method in which packets are allocated to carrier waves W1, W2, P in round-robin fashion. Chart 920 illustrates a packet allocation method according to a fifth embodiment, in which packets are allocated to carrier waves W1, W2, P by packet allocator 35 of FIG. 25.

In FIG. 26, a horizontal axis depicted in each of charts 910, 920 indicates a time that is ticked on a time scale equal to that of FIG. 7. Therefore, times t1, t2 of FIG. 26 are equal to times t1, t2 of FIG. 7. It is assumed that the error rate for carrier wave W2 changes as depicted in graph 720 of FIG. 7. Further, it is also assumed that carrier wave W1 is performing stable radio-transmission, and the tolerance parameter of carrier wave W1 is larger than that of carrier wave W2. Further, it is assumed that the tolerance parameter of carrier wave W1 is larger than that of carrier wave P.

In FIG. 26, it is assumed that a fault has occurred in carrier wave W2 at time "t11". In the case of allocating packets sequentially to carrier waves W1, P using a round-robin method as depicted in chart 910 of FIG. 26, a packet having a high QoS level may be allocated to carrier wave P having a tolerance parameter smaller than that of carrier wave W1.

Meanwhile, according to a fifth embodiment, packet allocator 35 of FIG. 25 is configured to allocate a packet having a high QoS level, on a priority basis, to working carrier wave W1 having a large tolerance parameter. Therefore, a packet having a high QoS level may be allocated, at times t1, t2, to carrier wave W1 having a higher line-quality as depicted in chart 920 of FIG. 26.

In this way, radio-communication apparatus 11 may be configured to calculate a tolerance parameter of a backup carrier wave when a fault has occurred in a working carrier wave, and to allocate a packet to a backup carrier wave having a large tolerance parameter or a working carrier wave in which there exist no faults occurring and radio-transmission is being kept, so that a packet having a high QoS level is allocated, on a priority basis, to a carrier wave having a large tolerance parameter. This allows radio-communication apparatus 11 to perform a stable radio-transmission on packets having a high QoS level even when a fault has occurred in a working carrier wave.

Further, it is also possible to apply the fifth embodiment to the second, third, or fourth embodiment. For example, radio-communication apparatus 11 that was described in the second, third, or fourth embodiment, may be configured to include components: a buffer, a BB-signal processor, modulator, and converter, which may serve as backup components operated for performing radio-transmission using a backup carrier wave. And, a SEL may be configured to allocate packets to carrier waves, when a fault has occurred in one of working carrier waves, based on tolerance parameters of a backup carrier wave and working carrier waves in which radio-transmission is being kept.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the scope of the invention.

What is claimed is:

1. A communication apparatus for allocating packets to a plurality of carrier waves via which the packets are transmitted to another communication apparatus, the communication apparatus comprising:
 a receiver configured to receive, from the another communication apparatus, first line-quality information including a current line-quality value for each of the plurality of carrier waves;
 a calculator configured to calculate, for each of the plurality of carrier waves, a tolerance parameter indicating a tolerable margin of the current line-quality value for causing a change of a modulation method that is to be used for each of the plurality of carrier waves, based on the received current line-quality value;
 an allocator configured to allocate the packets staying in the allocator to the plurality of carrier waves, based on a service-quality level assigned to each of the packets and the tolerance parameter calculated for each of the plurality of carrier waves, such that a first packet having the service-quality level equal to or higher than a second packet is allocated, on a priority basis, to a first carrier wave having the tolerance parameter equal to or larger than a second carrier wave to which the second packet is allocated; and
 a compositor configured to combine, for each of the plurality of carrier waves, two types of tolerance parameters into a combined tolerance parameter, wherein
 the first line-quality information includes, as a current line-quality value, a current C/N (Carrier to Noise ratio) value and a current receiving level, for each of the plurality of carrier waves, a C/N-tolerance parameter indicating a tolerable margin of the current C/N value for causing a change of a modulation method that is to be used for each of the plurality of carrier waves, a level-tolerance parameter indicating a tolerable margin of the current receiving level for causing a change of a modulation method that is to be used for each of the plurality of carrier waves,
 the calculator calculates, for each of the plurality of carrier waves, the C/N-tolerance parameter and the level-tolerance parameter,
 the compositor combines, for each of the plurality of carrier waves, the calculated C/N-tolerance parameter and the calculated level-tolerance parameter into the combined-tolerance parameter, and
 the allocator allocates the packets staying in the allocator to the plurality of carrier waves, based on a service-quality level assigned to each of the packets and the combined tolerance parameter calculated for each of the plurality of carrier waves, such that the first packet having the service-quality level equal to or higher than the second packet is allocated, on a priority basis, to a third carrier wave having the combined tolerance parameter equal to or larger than a fourth carrier wave to which the second packet is allocated.

2. The communication apparatus of claim 1, further comprising:
 a memory configured to store a target line-quality value for assuring a predetermined target error-rate, in association with each of modulation methods provided for transmitting the packets via the plurality of carrier waves, wherein the calculator acquires the target line-quality value associated with a modulation method that is currently being used for each of the plurality of carrier waves, by referring to the memory, and the calculator calculates, for each of the plurality of carrier waves, the tolerance parameter by obtaining a difference between the acquired target line-quality value and the current line-quality value received by the receiver.

3. The communication apparatus of claim 1, further comprising:

a variation-rate calculator configured to calculate, for each of the plurality of carrier waves, a first variation rate indicating a degree of change in the tolerance parameter during a predetermined duration time, wherein the allocator allocates the packets staying in the allocator to the plurality of carrier waves, based on the service-quality level assigned to each of the packets and a combination of the tolerance parameter and the first variation rate that are calculated for each of the plurality of carrier waves, such that the first packet having the service-quality level equal to or higher than the second packet is allocated, on a priority basis, to a third carrier wave that has a combination of the first variation rate equal to or smaller than a fourth carrier wave to which the second packet is allocated, and the tolerance parameter equal to or larger than the fourth carrier wave.

4. The communication apparatus of claim 1, further comprising:

a second variation-rate calculator configured to calculate, for each of the plurality of carrier waves, a second variation rate indicating a degree of change in the combined tolerance parameter during a predetermined duration time, wherein the allocator allocates the packets staying in the allocator to the plurality of carrier waves, based on the service-quality level assigned to each of the packets and a combination of the combined tolerance parameter and the second variation rate, such that the first packet having the service-quality level equal to or higher than the second packet is allocated, on a priority basis, to a fifth carrier wave that has a combination of the second variation rate equal to or smaller than a sixth carrier wave to which the second packet is allocated, and the combined tolerance parameter equal to or larger than the sixth carrier wave.

5. The communication apparatus of claim 1, wherein when a fault has occurred in a first carrier wave included in the plurality of carrier waves, the calculator further calculates a tolerance parameter for a backup carrier wave other than the plurality of carrier waves, the allocator allocates the packets staying in the allocator to the backup carrier wave and the plurality of carrier waves excluding the first carrier wave, based on the service-quality level assigned to each of the packets and the tolerance parameter calculated for each of the plurality of carrier waves and the backup carrier wave, such that the first packet having the service-quality level equal to or higher than the second packet is allocated, on a priority basis, to a third carrier wave having the tolerance parameter equal to or larger than a fourth carrier wave to which the second packet is allocated.

6. A method for a communication apparatus to allocate packets to a plurality of carrier waves via which the packets are transmitted to another communication apparatus, the method comprising:

receiving, from the another communication apparatus, a current line-quality value for each of the plurality of carrier waves;

calculating, for each of the plurality of carrier waves, a tolerance parameter indicating a tolerable margin of the current line-quality value for causing a change of a modulation method that is to be used for each of the plurality of carrier waves, based on the received current line-quality value; and allocating the packets staying in the communication apparatus to the plurality of carrier waves, based on a service-quality level assigned to each of the packets and the tolerance parameter calculated for each of the plurality of carrier waves, such that a first packet having the service-quality level equal to or higher than a second packet is allocated, on a priority basis, to a first carrier wave having the tolerance parameter equal to or larger than a second carrier wave to which the second packet is allocated; and combining, for each of the plurality of carrier waves, two types of tolerance parameters into a combined tolerance parameter, wherein the first line-Quality information includes, as a current line-quality value, a current C/N (Carrier to Noise ratio) value and a current receiving level, for each of the plurality of carrier waves, a C/N-tolerance parameter indicating a tolerable margin of the current C/N value for causing a change of a modulation method that is to be used for each of the plurality of carrier waves, a level-tolerance parameter indicating a tolerable margin of the current receiving level for causing a change of a modulation method that is to be used for each of the plurality of carrier waves, and the method further comprising:

calculating, for each of the plurality of carrier waves, the C/N-tolerance parameter and the level-tolerance parameter, combining, for each of the plurality of carrier waves, the calculated C/N-tolerance parameter and the calculated level-tolerance parameter into the combined-tolerance parameter, and allocating the packets staying in the allocator to the plurality of carrier waves, based on a service-quality level assigned to each of the packets and the combined tolerance parameter calculated for each of the plurality of carrier waves, such that the first packet having the service-quality level equal to or higher than the second packet is allocated, on a priority basis, to a third carrier wave having the combined tolerance parameter equal to or larger than a fourth carrier wave to which the second packet is allocated.

* * * * *